US006954212B2

(12) United States Patent
Lyons et al.

(10) Patent No.: US 6,954,212 B2
(45) Date of Patent: Oct. 11, 2005

(54) THREE-DIMENSIONAL COMPUTER MODELLING

(75) Inventors: Alexander Ralph Lyons, Berkshire (GB); Adam Michael Baumberg, Berkshire (GB)

(73) Assignee: Canon Europa N.V., Amstelveen (NL)

( * ) Notice: Subject to any disclaimer, the term of this patent is extended or adjusted under 35 U.S.C. 154(b) by 312 days.

(21) Appl. No.: 10/287,624

(22) Filed: Nov. 5, 2002

(65) Prior Publication Data

US 2003/0085891 A1 May 8, 2003

(30) Foreign Application Priority Data

Nov. 5, 2001  (GB) .............................................. 0126526

(51) Int. Cl.⁷ .............................................. G06T 15/00
(52) U.S. Cl. .................................... 345/582; 345/424
(58) Field of Search ............................... 345/582, 423, 345/424, 425, 430, 435, 437, 442; 382/268, 271, 272, 275, 285

(56) References Cited

U.S. PATENT DOCUMENTS

| 5,706,419 | A | * | 1/1998 | Matsugu et al. ............. 345/420 |
| 6,081,273 | A | | 6/2000 | Weng et al. ................. 345/425 |
| 6,281,904 | B1 | | 8/2001 | Reinhardt et al. ........... 345/430 |
| 6,356,272 | B1 | * | 3/2002 | Matsumoto et al. ......... 345/582 |
| 6,621,921 | B1 | * | 9/2003 | Matsugu et al. ............. 382/154 |
| 6,640,004 | B2 | * | 10/2003 | Katayama et al. .......... 382/154 |
| 6,823,080 | B2 | * | 11/2004 | Iijima et al. ................. 382/154 |
| 2001/0056308 | A1 | | 12/2001 | Petrov et al. ................. 700/98 |
| 2002/0050988 | A1 | | 5/2002 | Petrov et al. ............... 345/918 |
| 2002/0085748 | A1 | | 7/2002 | Baumberg .................. 382/154 |
| 2002/0186216 | A1 | | 12/2002 | Baumberg et al. .......... 345/422 |
| 2002/0190982 | A1 | | 12/2002 | Kotcheff et al. ............. 345/420 |

FOREIGN PATENT DOCUMENTS

| EP | 0898245 A1 | 2/1999 | ............. G06T/7/00 |
| GB | 2358307 A | 7/2001 | ............. G06T/7/00 |
| GB | 2369260 A | 5/2002 | ........... H04N/5/262 |
| GB | 2369541 A | 5/2002 | ........... G06T/15/20 |
| JP | 9-170914 | 6/1997 | ........... G01B/11/24 |
| JP | 2000-163590 | 6/2000 | ............. G06T/7/00 |
| JP | 2000-339499 | 12/2000 | ........... G06T/17/40 |
| WO | WO 01/39124 A2 | 5/2001 | ............. G06T/7/00 |

OTHER PUBLICATIONS

M. Jones et al., "Efficient Representation of Object Shape For Silhouette Intersection", IEE Proc., Vision, Image & Signal Processing, Institution of Electric Engineers, GB, vol. 142, No. 6, Dec. 1, 1995, pp. 359–365, XP006004514, ISSN: 1350–245X.

(Continued)

*Primary Examiner*—Almis Jankus
(74) *Attorney, Agent, or Firm*—Fitzpatrick, Cella, Harper & Scinto

(57) ABSTRACT

To generate a 3D computer model of a subject object 210, images 300–316, 380–384 of the subject object are recorded from different viewing positions and directions. The image data is processed to generate a plurality of sets of images, each set containing images having registered imaging positions and directions. A preliminary 3D computer model 390 is generated using the images from a first of the sets such that the position and orientation of the preliminary 3D computer model 390 is registered with the images in the set. The imaging positions and directions of the images in the first set are then registered with the imaging positions and directions of the images in each other respective set. This is done by projecting the preliminary 3D computer model 390 into images from each other set, and changing the relative position and orientation of the preliminary 3D computer model 390 and images to align the silhouette of the projected 3D computer model with the silhouette of the imaged subject object in the images. A refined 3D computer model of the subject object is generated using images from the different sets which are registered.

42 Claims, 14 Drawing Sheets

OTHER PUBLICATIONS

H.P.A. Lensch et al., "Automated Texture Registration And Stitching For Real World Models", Computer Graphics and Applications, 2000, Proceedings, The Eighth Pacific Conf., Hong Kong, China, Oct. 3–5, 2000, Los Alamitos, CA., IEEE Computer, Soc. US., Oct. 3, 2000, pp. 317–326, XP010523024, ISBN: 0–7695–0868–5.

J.L. Chen, et al., "Recovering And Tracking Pose Of Curved 3D Objects From 2D Images", Computer Vision and Pattern Recognition, 1993, Proceedings CVPR '93, 1993 IEEE Computer Society Conf. NY, USA Jun. 15–17, 1993, Los Alamitos, CA., IEEE Computer. Soc. Jun. 15, 1993, pp. 233–239, XP010095849, ISBN: 0–18186–3880–X.

M. Jones et al., "Registration of Image Sets Using Silhouette Consistency", IEE Proceedings, Vision, Image And Signal Processing, Institution of Electric Engineers, GB, vol. 147, No. 1, Feb. 18, 2000, pp. 1–8, XP006014550, ISSN: 1350–245X.

Martin Lohlein, "A Volumetric Intersection Algorithm for 3d–Reconstruction Using a Boundary–Representation", http://i31www.ira.uka.de/diplomarbeiten/da_martin_loehlein/Reconstruction.html.

M. Szilvasi–Nagy, "An Algorithm for Determining the Intersection of Two Simple Polyhedra", Computer Graphics Forum 3 (1984), pp. 219–225.

Wolfgang Niem, "Automatic reconstruction of 3D objects using a mobile camera", Image and Vision Computing 17, (1999), pp. 125–134.

R. I. Hartley, "Euclidean Reconstruction From Uncalibrated Views", Applications of Invariance in Computer Vision, Mundy, Zisserman and Forsyth eds., Azores 1993, pp. 237–256.

J. Illingworth & A. Hilton, "Looking to build a model world–automatic construction of static object models using computer vision", Electronics & Communication Engineering Journal, Jun. 1998, pp. 103–113.

Steven J. Gortier et al., "The Lumigraph", Computer Graphics Proceedings, Annual Conf. Series, 1996 ACM–0–89791–746–4/96/008, pp. 43–52.

Peter J. Neugebauer & Konrad Klein, "Texturing 3D Models of Real World Objects from Multiple Unregistered Photographic Views", EUROGRAPHICS '99, vol. 18 (1999), No. 3.

Greg Turk & Marc Levoy, "Zippered Polygon Meshes from Range Images", Computer Graphics Proceedings, Annual Conference Series, 1994, ACM SIGGRAPH, pp. 311–318, ISBN 0–89791–667–0.

* cited by examiner

Fig.5.
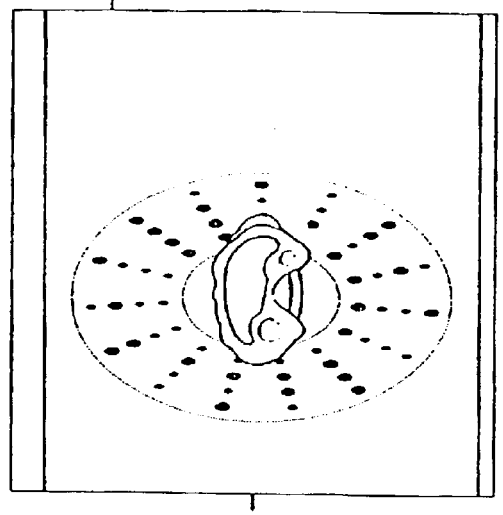
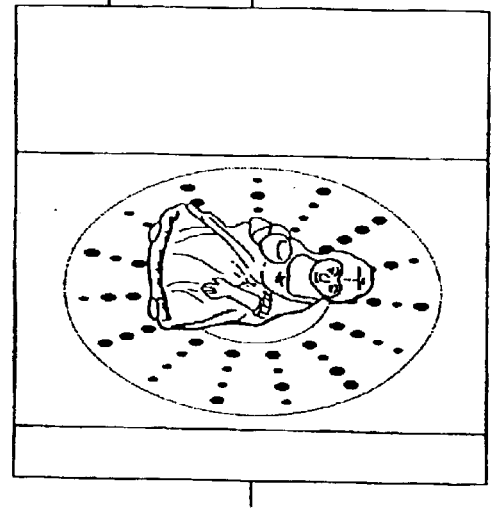
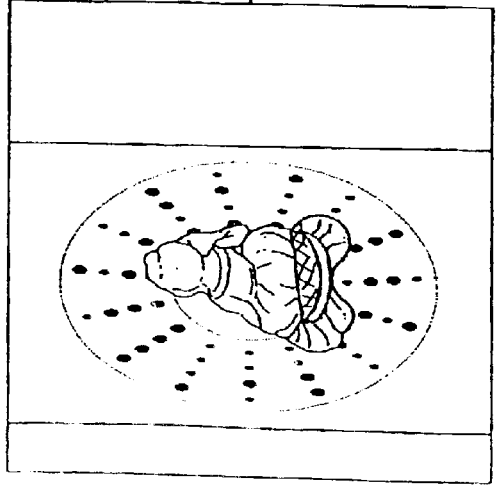

THREE-DIMENSIONAL COMPUTER MODELLING

The present invention relates to the computer processing of image data defining images of an object to generate a three-dimensional (3D) computer model of the object.

Many methods are known for generating 3D computer models of objects.

In particular, methods are known in which images of an object to be modelled are recorded at different positions and orientations. Each recorded image is then processed to calculate the position and orientation at which it was recorded, and a 3D computer model of the object is generated using the input images and the calculated positions and orientations.

In a first type of such a known method, the subject object being modelled is placed with a calibration object having a known pattern of features thereon, and images showing the subject object together with the calibration pattern are recorded from different positions and directions. Each recorded image is then processed to calculate the position and orientation at which is was recorded on the basis of the positions in the image of the features in the calibration object's pattern. Because the subject object and calibration pattern remain stationary relative to each other while the images are recorded, the positions and orientations of the input images relative to the subject object are known as a result of these calculations, and consequently a 3D computer model of the subject object can be generated from the images. Examples of this type of technique are described, for example, in "Automatic Reconstruction of 3D Objects Using A Mobile Camera" by Niem in Image and Vision Computing 17 (1999) pages 125–134, "The Lumigraph" by Gortler et al in Computer Graphics Proceedings, Annual Conference Series, 1996 ACM-0-89791-764-4/96/008, JP-A-9-170914 (and corresponding co-pending U.S. patent application Ser. No. 08/767,018) and the proprietor's PCT patent application WO-A-01/39124 (now co-pending U.S. patent application Ser. No. 10/129,626) (the full contents of which are incorporated herein by cross-reference).

Alternatively, in a second type of known method, the subject object to be modelled is imaged alone. The position and orientation of each image is then calculated by matching features on the object between the different input images and calculating the relative position and orientation of each image in dependence upon the respective positions of the matching features in the images. Examples of such a technique are described, for example, in EP-A-0898245.

Both of these types of known methods, however, suffer from the problem that features of the subject object can only be accurately modelled in the 3D computer model if the features are visible in at least one (and preferably more) of the initial images.

A further problem arises in the case of the first type of technique (in which the subject object is imaged with a calibration pattern). This is because the subject object cannot be moved relative to the calibration pattern while the images are recorded (otherwise the position and orientation of the subject object is not constant with respect to the calibration pattern and is therefore not known relative to the calculated positions and orientations of the images, with the result that a 3D computer model of the subject object cannot be generated from the images). Consequently, in the typical case where the subject object is placed on the calibration object for imaging, the base of the subject object rests on the calibration object, and therefore features on the base cannot be imaged and modelled in the 3D computer model. Further, suspending the subject object above the calibration object does not solve the problem because the camera would have to be pointed up to image the base and therefore the calibration pattern would not appear in the images, with the result that the calibration pattern features could not be used to calculate the positions and orientations of the images of the base.

In the case of the second type of technique, a problem arises because the positions and orientations of the images are calculated relative to each other on the basis of matching subject object features in the images. Accordingly, each image needs to be recorded such that at least some matchable features on the subject object are visible in the image and are also visible in at least one further image. This requirement can severely restrict the positions and directions from which images can be taken.

The present invention aims to address at least one of the problems above.

According to the present invention, a 3D computer model of a subject object is generated by processing images of the subject object recorded from different viewing positions and directions. A plurality of sets of registered images are generated on the basis of the positions of calibration pattern features and/or matching features in the images. Within each set, the positions and orientations of the images are defined such that the relative positions and orientations of all images in the set are known. However, the relationship between the imaging positions and orientations of images in one set and the imaging positions and orientations of images in another set is not calculated. A preliminary 3D computer model of the subject object is generated using one of the registered sets of images such that the position and orientation of the computer model relative to the images in the set is known. The position and orientation of the preliminary 3D computer model relative to the images in each other respective set of registered images is calculated by projecting the preliminary 3D computer model into each of at least some of the images in each other respective set and comparing the resulting projection with the image of the subject object in the images. In this way, the imaging relationship between the sets is calculated and therefore the imaging positions and orientations of all of the input images are registered. Knowing the relative imaging positions and orientations of all of the images, a refined 3D computer model is generated.

By generating different sets of registered images, calculating the imaging relationship between the registered sets of images and using this to generate a refined 3D computer model, the initial images of the subject object do not need to be recorded such that the features shown therein allow the imaging positions and orientations of all of the images relative to each other to be calculated on the basis of features in the images. Consequently, if a calibration pattern is used, the user is able to record images of the subject object in a first configuration relative to a calibration pattern (for example the subject object standing on the calibration pattern) and is then able to record images of the subject object and calibration pattern in a second configuration (for example the subject object on its side relative to the calibration pattern so that the images show the base of the subject object). The images of the first configuration result in one set of registered images during processing and the images of the second configuration result in a different set of registered images. Similarly, if the subject object is imaged without a calibration object, a first set of registered images may be generated during processing comprising images in which sufficient numbers of features on the subject object can be matched between the images to allow the relative positions and orientations to be calculated. A further set of registered images may be generated from images which do not show sufficient features of the subject object which are also visible in images in the first set to enable them to be registered with images in the first set. Thus, for example, images in the first set may comprise images of the subject object standing on a surface and images in the second set may comprise images of the base of the subject object (not visible in the images of the first set). The second set may include just a single image.

By calculating the imaging relationship between the different registered sets and then using the images from different sets to generate the refined 3D computer model, features from all of the images can be faithfully modelled in the resulting computer model.

The registration of the preliminary 3D computer model with the registered images in a set may be carried out by changing the alignment of the 3D computer model and the set of images until the silhouette of the 3D computer model aligns with the silhouette of the subject object in at least some of the images.

The registration of the preliminary 3D computer model with the registered images in a set may be carried out in accordance with user input signals or may be carried out automatically.

The present invention also provides a processing apparatus and method for use in performing the processing set out above.

The present invention also provides a computer program product, for example as embodied as a storage device or signal carrying instructions, for causing a programmable processing apparatus to become configured as such an apparatus or to become operable to perform such a method.

Embodiments of the invention will now be described, by way of example only, with reference to the accompanying drawings, in which like reference numbers are used to designate like parts, and in which:

FIG. 1 schematically shows the components of a first embodiment of the invention, together with the notional functional processing units into which the processing apparatus component may be thought of as being configured when programmed by programming instructions;

FIG. 5 shows examples of the images of the subject object in the second set which are input to the processing apparatus in FIG. 1;

FIG. 12, comprising

FIRST EMBODIMENT

Figure 1:
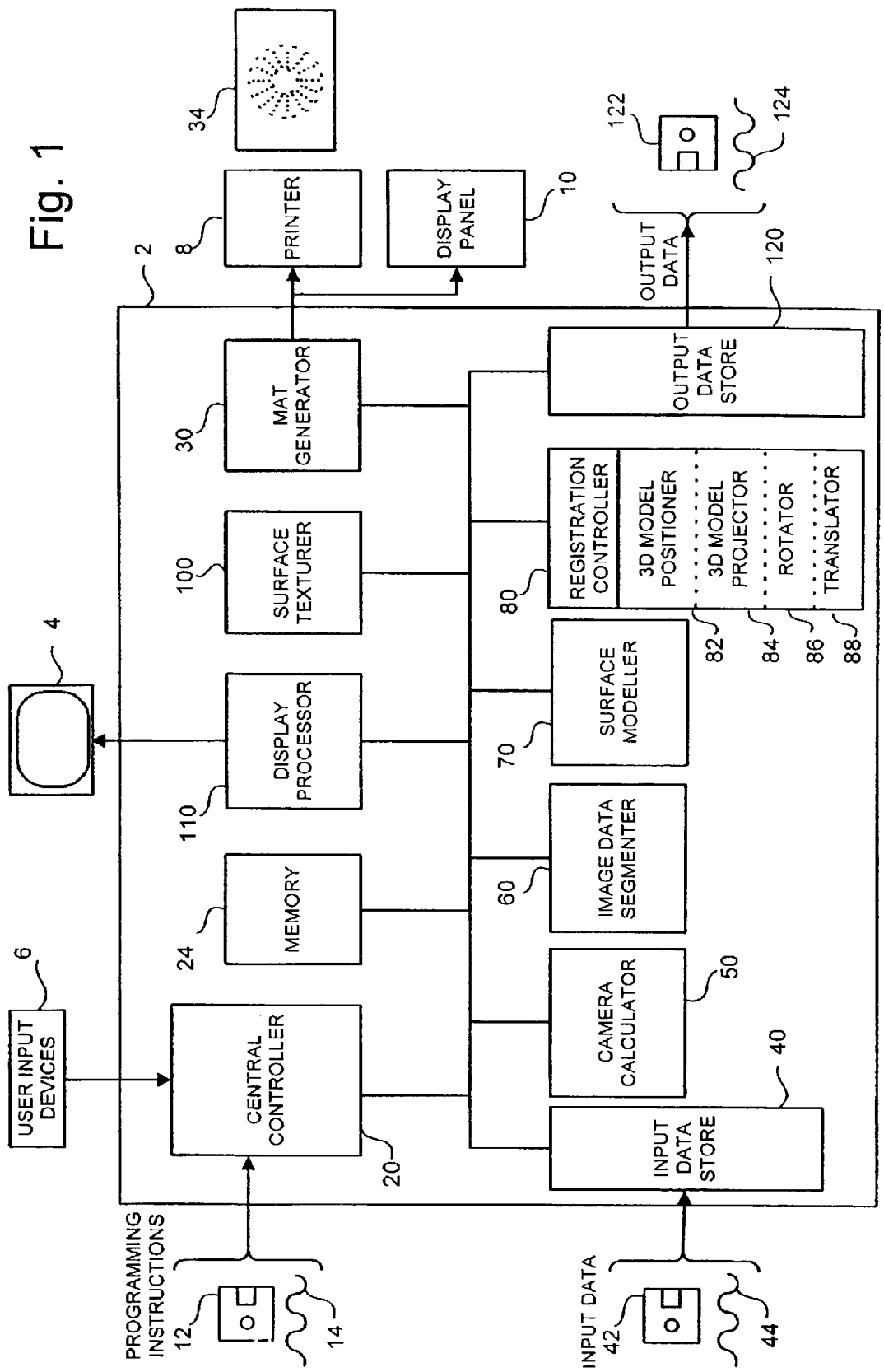

Referring to FIG. 1, an embodiment of the invention comprises a processing apparatus 2, such as a personal computer, containing, in a conventional manner, one or more processors, memories, graphics cards etc, together with a display device 4, such as a conventional personal computer monitor, user input devices 6, such as a keyboard, mouse etc, a printer 8, and a display panel 10 comprising a flat panel having controllable pixels, such as the PL400 manufactured by WACOM.

The processing apparatus 2 is programmed to operate in accordance with programming instructions input, for example, as data stored on a data storage medium, such as disk 12, and/or as a signal 14 input to the processing apparatus 2, for example from a remote database, by transmission over a communication network (not shown) such as the Internet or by transmission through the atmosphere, and/or entered by a user via a user input device 6 such as a keyboard.

As will be described in more detail below, the programming instructions comprise instructions to cause the processing apparatus 2 to become configured to generate data defining a 3D computer model of a subject object by processing input data defining a first set of images of the subject object recorded at different positions and orientations, and at least one further set of images comprising at least one further image of the subject object. The images in the further set(s) may show parts of the subject object not visible in the images of the first set, so that these parts may be accurately modelled in the 3D computer model.

More particularly, the programming instructions comprise instructions to cause the processing apparatus 2 to become operable to process the input data to calculate the positions and orientations at which the input images in the first set were recorded (thereby generating a first registered set of images), to calculate the positions and orientations at which the input images in each additional set were recorded (thereby generating additional registered sets of images), to generate data defining a preliminary 3D computer of the subject object using the registered images from the first set, to register the preliminary 3D computer model with the registered images from each further set (thereby registering the images from the first set with the images from all of the further sets), and to generate a refined 3D computer model (including features visible only in images from the further set(s) as well as those visible in the images in the first set) using the calculated registration of all of the images.

In this embodiment, the subject object is imaged on a calibration object (a two-dimensional photographic mat in this embodiment) which has a known pattern of features thereon. The input images within each set comprise images recorded at different positions and orientations of the subject object and the calibration object in a fixed respective configuration (that is, the position and orientation of the subject object relative to the calibration object is the same for the images within any given set, but is different for each set). The positions and orientations at which the input images were recorded are calculated by detecting the positions of the features of the calibration object pattern in the images. The preliminary 3D computer model is registered to the images in a further set by projecting the 3D computer model into at least some of the images in the set, and changing the relative position and orientation of the 3D computer model and the registered images in the set to reduce alignment errors between the silhouette of the 3D computer model and the silhouette of the imaged subject object in the images. In this embodiment, changes in the relative position and orientation of the 3D computer model and the registered images in a set are made in accordance with instructions input by a user, although it is possible to perform this processing automatically, as described in subsequent embodiments.

When programmed by the programming instructions, processing apparatus 2 can be thought of as being configured as a number of functional units for performing processing operations. Examples of such functional units and their interconnections are shown in FIG. 1. The units and interconnections illustrated in FIG. 1 are, however, notional, and are shown for illustration purposes only to assist understanding; they do not necessarily represent units and connections into which the processor, memory etc of the processing apparatus 2 actually become configured.

Referring to the functional units shown in FIG. 1, a central controller 20 is arranged to process inputs from the user input devices 6, and also to provide control and processing for the other functional units. Memory 24 is provided to store the operating instructions for the processing apparatus, and additionally for use as a working memory by central controller 20 and the other functional units.

Mat generator 30 is arranged to generate control signals to control printer 8 or to control display panel 10 to print a calibration pattern on a recording medium such as a piece of paper to form a printed "photographic mat" 34 or to display the calibration pattern on display panel 10 to display a photographic mat. As will be described in more detail below, the photographic mat comprises a predetermined calibration pattern of features and the subject object for which a 3D computer model is to be generated is placed on the printed photographic mat 34 or on the display panel 10 on which the calibration pattern is displayed. Sets of images of the subject object and the calibration pattern are then recorded and input to the processing apparatus 2. Each set comprises images, recorded from different positions and orientations, of the subject object and calibration pattern, with the position and orientation of the subject object relative to the calibration pattern being the same within any one set of images and being different for each different set. Mat generator 30 is arranged to store data defining the calibration pattern of features printed or displayed on the photographic mat for use by the processing apparatus 2 when calculating the positions and orientations at which the input images were recorded. More particularly, in this embodiment, mat generator 30 is arranged to store data defining the pattern of features together with a coordinate system relative to the pattern of features (which, in effect, defines a reference position of orientation of the calibration pattern), and processing apparatus 2 is arranged to calculate the positions and orientations at which the input images were recorded in the defined coordinate system (and thus relative to the reference position and orientation). In this way, for each set of input images, the recording positions and orientations of the input images are calculated relative to each other, and accordingly a registered set of input images is generated.

In this embodiment, the calibration pattern on the photographic mat comprises spatial clusters of features, for example as described in the proprietor's PCT Application WO-A-01/39124, now co-pending U.S. patent application Ser. No. 10/129,626 (the full contents of which are incorporated herein by cross-reference) or any known pattern of features, such as a pattern of coloured dots, with each dot having a different hue/brightness combination so that each respective dot is unique (for example, as described in JP-A-9-170914, which is equivalent to co-pending U.S. patent application Ser. No. 08/767,018), a pattern of concentric circles connected by radial line segments with known dimensions and position markers in each quadrant (for example, as described in "Automatic Reconstruction of 3D Objects Using a Mobile Camera" by Niem in Image and Vision Computing 17, 1999, pages 125–134), or a pattern comprising concentric rings with different diameters (for example as described in "The Lumigraph" by Gortler et al in Computer Graphics Proceedings, Annual Conference Series, 1996 ACM-0-89791-764-4/96/008).

In the remainder of the description of this embodiment, it will be assumed that the calibration pattern is printed by printer 8 on a recording medium (in this embodiment, a sheet of paper) to generate a printed photographic mat 34, although, as mentioned above, the calibration pattern could be displayed on display panel 10 instead.

Input data store 40 is arranged to store data input to the processing apparatus 2, for example as data stored on a storage device, such as disk 42, as a signal 44 transmitted to the processing apparatus 2, or using a user input device 6. The input data defines a plurality of images of the subject object on the photographic mat 34 recorded at different positions and orientations. The input images are arranged in sets, such that, for each respective set, the position and orientation of the subject object relative to the calibration pattern is the same for all images in the set, and such that the position and orientation of the subject object relative to the calibration pattern is different for each set. The input images comprise at least two sets of images. The first set comprises at least two images recorded from different positions and orientations. The second set comprises at least one image. In addition, in this embodiment, the input data also includes data defining the intrinsic parameters of the camera which recorded the input images, that is, the aspect ratio, focal length, principal point (the point at which the optical axis intersects the imaging plane), first order radial distortion coefficient, and skew angle (the angle between the axes of the pixel grid; because the axes may not be exactly orthogonal).

The input data defining the input images may be generated, for example, by downloading pixel data from a digital camera which recorded the images, or by scanning photographs using a scanner (not shown).

The input data defining the intrinsic camera parameters may be input by a user using a user input device 6.

Camera calculator 50 is arranged to process each input image to detect the positions in the image of the features in the calibration pattern of the photographic mat 34 and to calculate the position and orientation of the camera relative to the photographic mat 34 when the image was recorded. In this way, because the position and orientation of each input image is calculated relative to the same calibration pattern, the positions and orientations of the input images in each set are defined in a common coordinate system and therefore a registered set of input images is generated. However, the input images in one set are not registered to the input images in a different set. This is because the position and orientation of the subject object relative to the calibration pattern is different for each set of images. Consequently, as will be explained below, registration controller 80 is provided to register the different sets of images.

Image data segmenter 60 is arranged to process each input image to separate image data corresponding to the subject object from other image data in the image.

Surface modeller 70 is arranged to process the segmented image data produced by image data segmenter 60 for a given set of images and the camera positions and orientations calculated by camera calculator 50 for the set of images, to generate data defining a preliminary 3D computer model comprising a polygon mesh representing the surface of the subject object. Surface modeller 70 is further arranged in this embodiment to generate a final, refined 3D computer model comprising a polygon mesh representing the surface of the subject object using all of the input images when they have been registered by registration controller 80.

Registration controller 80 is arranged to register the different sets of registered input images generated by camera calculator 50.

In this embodiment, registration controller 80 comprises a 3D model positioner 82, a 3D model projector 84, a rotator 86, and a translator 88.

3D model positioner 82 is arranged to position the 3D computer model generated by surface modeller 70 in the same coordinate system as the registered images in a set other than the set used by surface modeller 70 to generate the 3D computer model. Thus, for example, if the 3D computer model was generated from a first set of input images, 3D model positioner 82 is arranged to position the 3D computer model in the respective coordinate system of each additional set of input images.

3D model projector 84 is arranged to project the 3D computer model generated by surface modeller 70 into each of a plurality of images (three in this embodiment) from the set having the coordinate system into which the 3D computer model was placed by 3D model positioner 82. In this embodiment, images with substantially orthogonal viewing directions are selected as the images into which to project the 3D computer model, if such images are available. 3D model projector 84 is further arranged to generate image data for display to the user showing the silhouette of the projected 3D computer model and the silhouette of the imaged subject object in each image into which the 3D computer model is projected.

Rotator 76 and translator 78 are operable in response to user input instructions to rotate and translate the 3D computer model generated by surface modeller 70 relative to the coordinate system of the registered set of images into which it was placed by 3D model positioner 82.

As will be explained in detail below, the rotation and translation of the 3D computer model by the user and the computer model projection and display of image data by 3D model projector 84 are carried out in an iterative manner. In this way, the results of the user's rotation and translation are displayed in real-time, enabling the user to make further rotations and translations to register correctly the 3D computer model generated by surface modeller 70 with the registered set of input images.

Surface texturer 100 is arranged to generate texture data from the input images for rendering on to the final 3D computer model generated by surface modeller 70.

Display processor 110, under the control of central controller 20, is arranged to display images and instructions to the user via display device 4 during the processing by processing apparatus 2. In addition, under control of central controller 20, display processor 110 is arranged to display images of the final 3D computer model from a user-selected viewpoint by processing the final surface model data and rendering texture data produced by surface texturer 100 on to the surface model.

Output data store 120 is arranged to store data defining the final 3D computer model generated by surface modeller 70 and, optionally, the texture data generated by surface texturer 100. Central controller 20 is arranged to control the output of data from output data store 120, for example as data on a storage device, such as disk 122, and/or as a signal 124. A recording of the output data may be made by recording the output signal 124 either directly or indirectly using recording apparatus (not shown).

Figure 2:
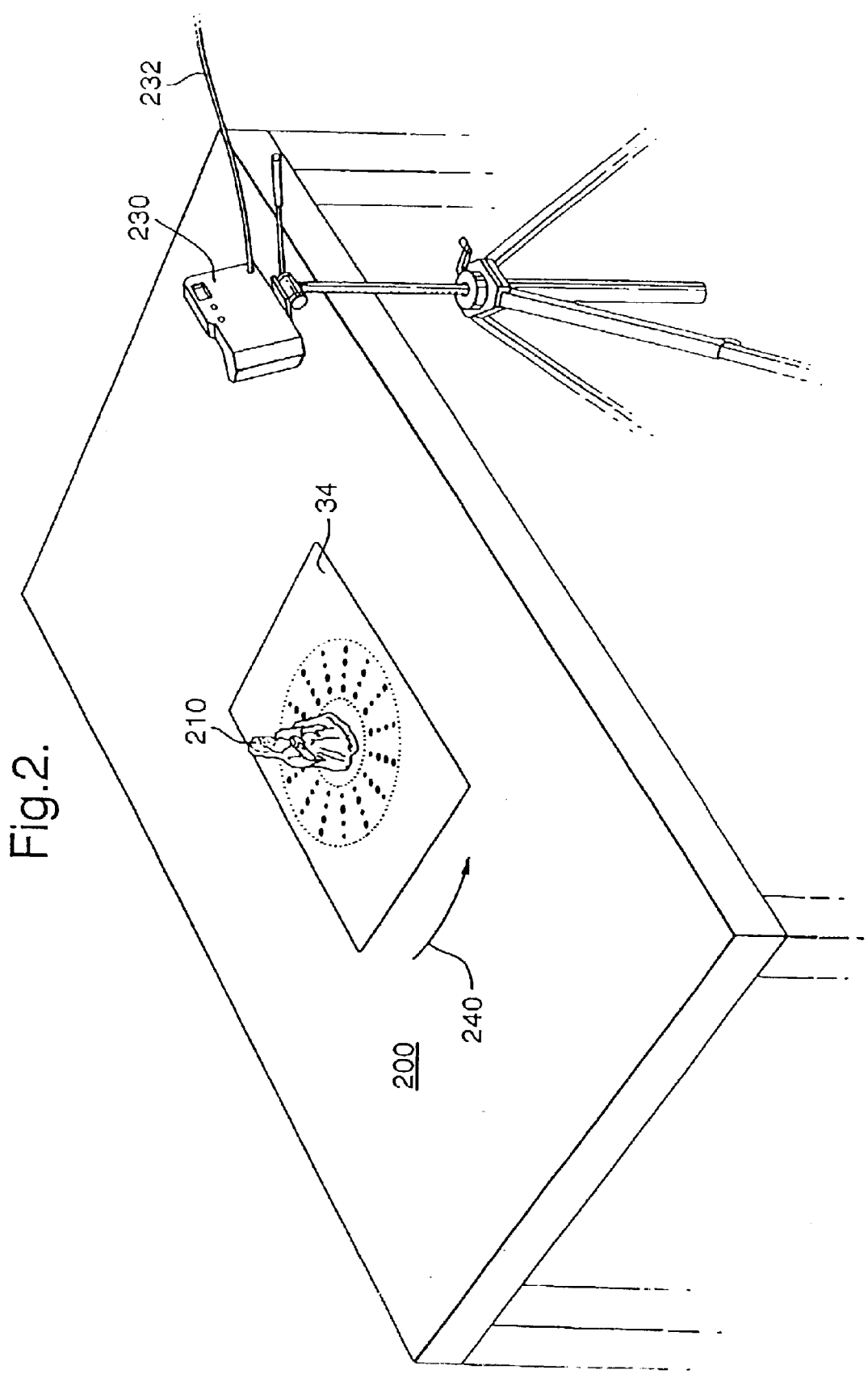
FIG. 2 illustrates the recording of a first set of images of a subject object for which a 3D computer model is to be generated.

Referring now to FIG. 2, the recording of a first set of input images for input to processing apparatus 2 will be described.

The printed photographic mat 34 is placed on a surface 200, and the subject object 210 for which a 3D computer model for which a 3D computer model is to be generated, is placed substantially at the centre of the photographic mat 34 so that the subject object 210 is surrounded by the features making up the calibration pattern on the mat.

Images of the subject object 210 and photographic mat 34 are recorded at different positions and orientations to show different parts of the subject object 210 using a digital camera 230. In this embodiment, data defining the images recorded by the camera 230 is input to the processing apparatus 2 as a signal 44 along a wire 232.

More particularly, in this embodiment, camera 230 remains in a fixed position, and the photographic mat 34 with the subject object 210 thereon is moved (translated) and rotated (for example, in the direction of arrow 240) on surface 200 and photographs of the object 210 at different positions and orientations relative to the camera 230 are recorded. For each set of input images, during the rotation and translation of the photographic mat 34 on surface 200, the subject object 210 does not move relative to the mat 34, so that the position and orientation of the subject object 210 relative to the calibration pattern is the same for each image in the set.

Images of the top of the subject object 210 are recorded by removing the camera 230 from the tripod and imaging the subject object 210 from above.

Figure 3:
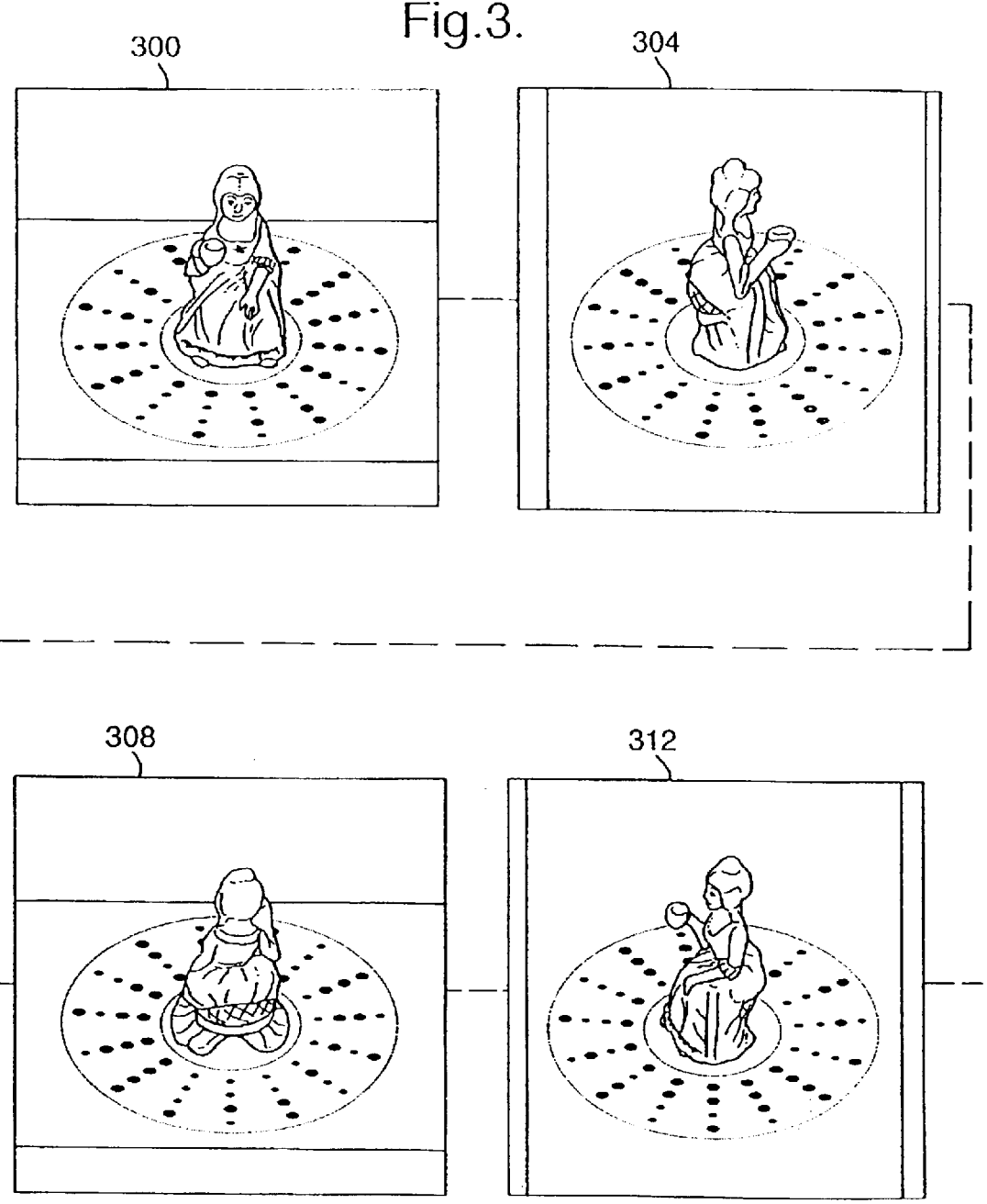
FIG. 3 shows examples of images of the subject object in the first set which are input to the processing apparatus in FIG. 1.

FIG. 3 shows examples of images 300, 304, 308 and 312 from a first set of images defined in data input to processing apparatus 2 showing the subject object 210 and photographic mat 34 in different positions and orientations relative to camera 230.

Figure 4:
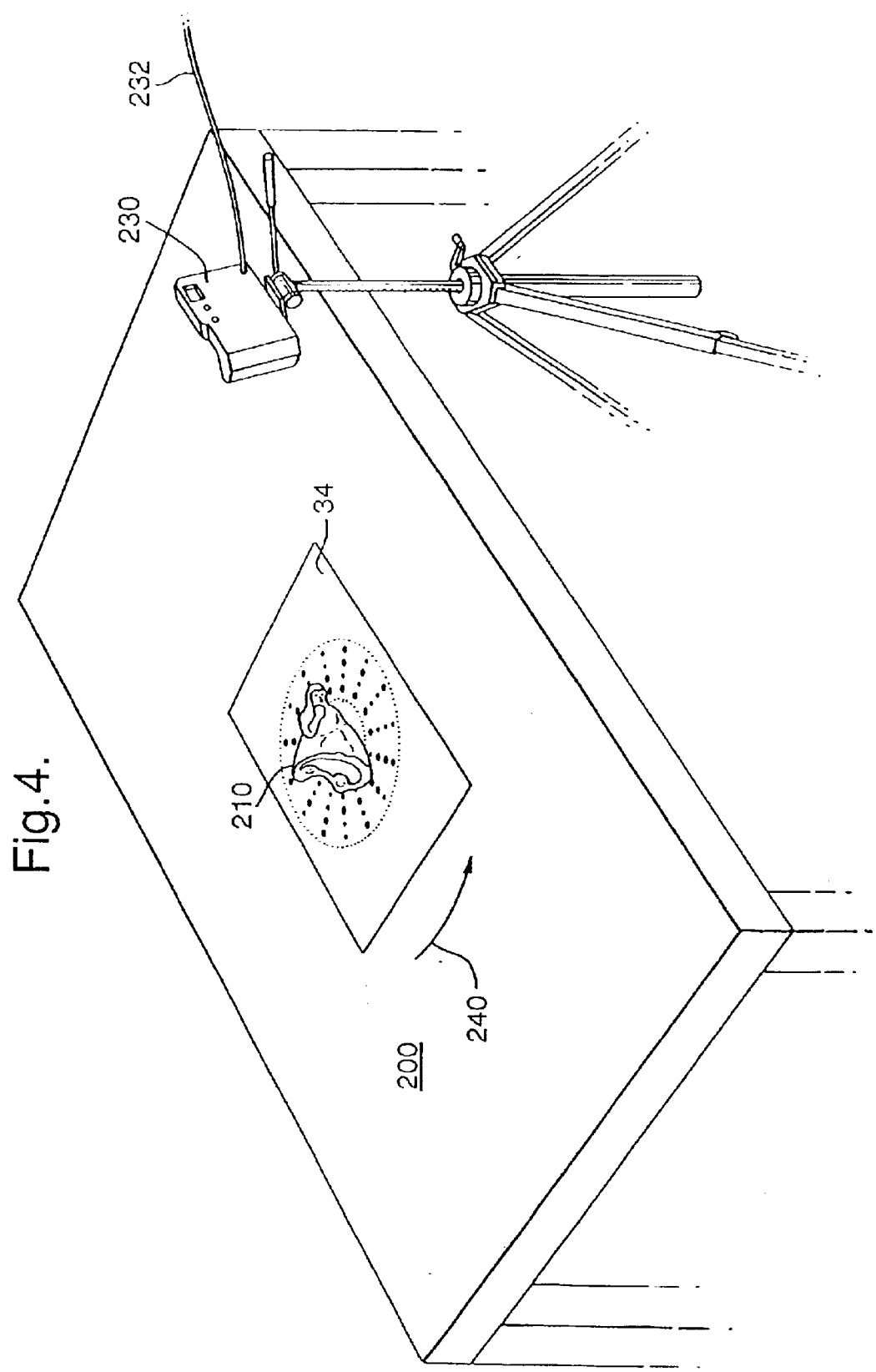
FIG. 4 illustrates the recording of a second set of images of the subject object.

FIG. 4 illustrates the recording of a second set of input images for input to processing apparatus 2.

Referring to FIG. 4, the subject object 210 is again placed substantially at the centre of the photographic mat 34, although the position and orientation of the subject 210 relative to the calibration pattern on the photographic mat 34 is different to the position and orientation for the first set of input images.

Images of the subject object 210 and photographic mat 34 are again recorded at different positions and orientations using camera 230 (by translating and rotating the photographic mat 34 with the subject object 210 thereon in this embodiment and/or by moving the camera 230 to image the subject object 210 from higher elevation angles). During the rotation and translation of the photographic mat 34, the subject object 210 does not move relative to the mat 34, so that the position and orientation of the subject object 210 relative to the calibration pattern is the same for each image in the second set.

In this way, by allowing the user to change the position and orientation of the subject object 210 relative to the photographic mat 34 before the images in the second set are recorded, the user can arrange the subject object 210 on the photographic mat 34 so that parts of the subject object 210 which were not visible when the images of the first set were recorded (such as the of the subject object 210) are now visible and can therefore be imaged and subsequently modelled in the 3D computer model of the subject object.

FIG. 5 shows examples of images 380, 382 and 384 from a second set of images defined in the data input to processing apparatus 2 showing the subject object 210 and photographic mat 34 in different positions and orientations relative to camera 230.

Figure 6:
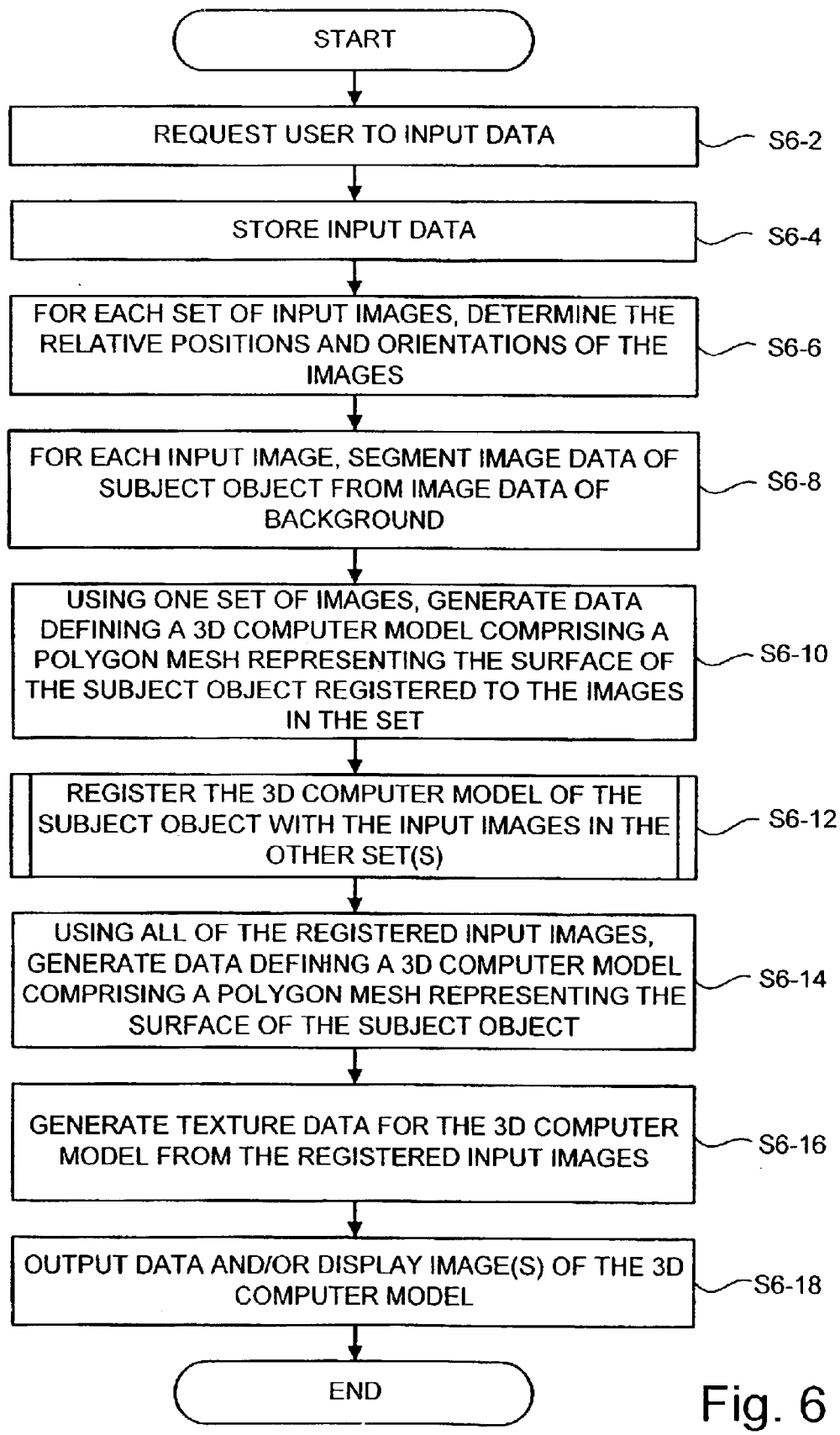
FIG. 6 shows the processing operations performed by the processing apparatus in FIG. 1 to process input data.

FIG. 6 shows the processing operations performed by processing apparatus 2 to process the input data in this embodiment.

Referring to FIG. 6, at step S6-2, central controller 20 causes display processor 110 to display a message on display device 4 requesting the user to input data for processing.

At step S6-4, data input by the user in response to the request at step S6-2 is stored in the input data store 40. More particularly, as set out above, in this embodiment, the input data comprises data defining images of the subject object 210 and photographic mat 34 recorded at different relative positions and orientations, with the images being divided into sets such that the position and orientation of the subject object 210 relative to the photographic mat 34 is the same for the images within each respective set, but is different for each set. In this embodiment, the input data also includes data defining the intrinsic parameters of the camera 230 which recorded the input images.

At step S6-6, camera calculator 50 processes each respective set of input images and the intrinsic camera parameter data stored at step S6-4, to determine the position and orientation of the camera 230 relative to the calibration pattern on the photographic mat 34 (and hence relative to the subject object 210) for each input image in the set. This processing comprises, for each input image in a set, detecting the features in the image which make up the calibration pattern on the photographic mat 34, comparing the positions of the features in the image to the positions of the features in the stored pattern for the photographic mat, and calculating therefrom the position and orientation of the camera 230 relative to the mat 34 when the image was recorded. The processing performed by camera calculator 50 at step S5-6 depends upon the calibration pattern of features used on the photographic mat 34. Accordingly, suitable processing is described, for example, in PCT application WO-A-01/39124 (now co-pending U.S. patent application Ser. No. 10/129, 626), JP-A-9-170914 (corresponding to co-pending U.S. patent application Ser. No. 08/767,018), "Automatic Reconstruction of 3D Objects Using a Mobile Camera" by Niem in Image and Vision Computing 17, 1999, pages 125–134, and "The Lumigraph" by Gortler et al in Computer Graphics Proceedings, Annual Conference Series, 1996 ACM-0-89791-764-4/96/008. It should be noted that the positions of the features of the calibration pattern in each input image may be identified to processing apparatus 2 by the user (for example, by pointing and clicking on each calibration pattern feature in displayed images) rather than being detected independently by camera calculator 50 using the image processing techniques in the listed references. The result of the processing by camera calculator 50 is that the position and orientation of each input image within a set has now been calculated relative to the calibration pattern on the photographic mat 34, and hence the images within each respective set have been registered to each other.

At step S6-8, image data segementor 60 processes each input image stored at step S6-4 to segment image data representing the subject object 210 from other image data ("background" image data). This processing is performing using a conventional image segmentation method, for example as described in part 2.2 of Annex A of GB-A-2358307.

Figure 7:
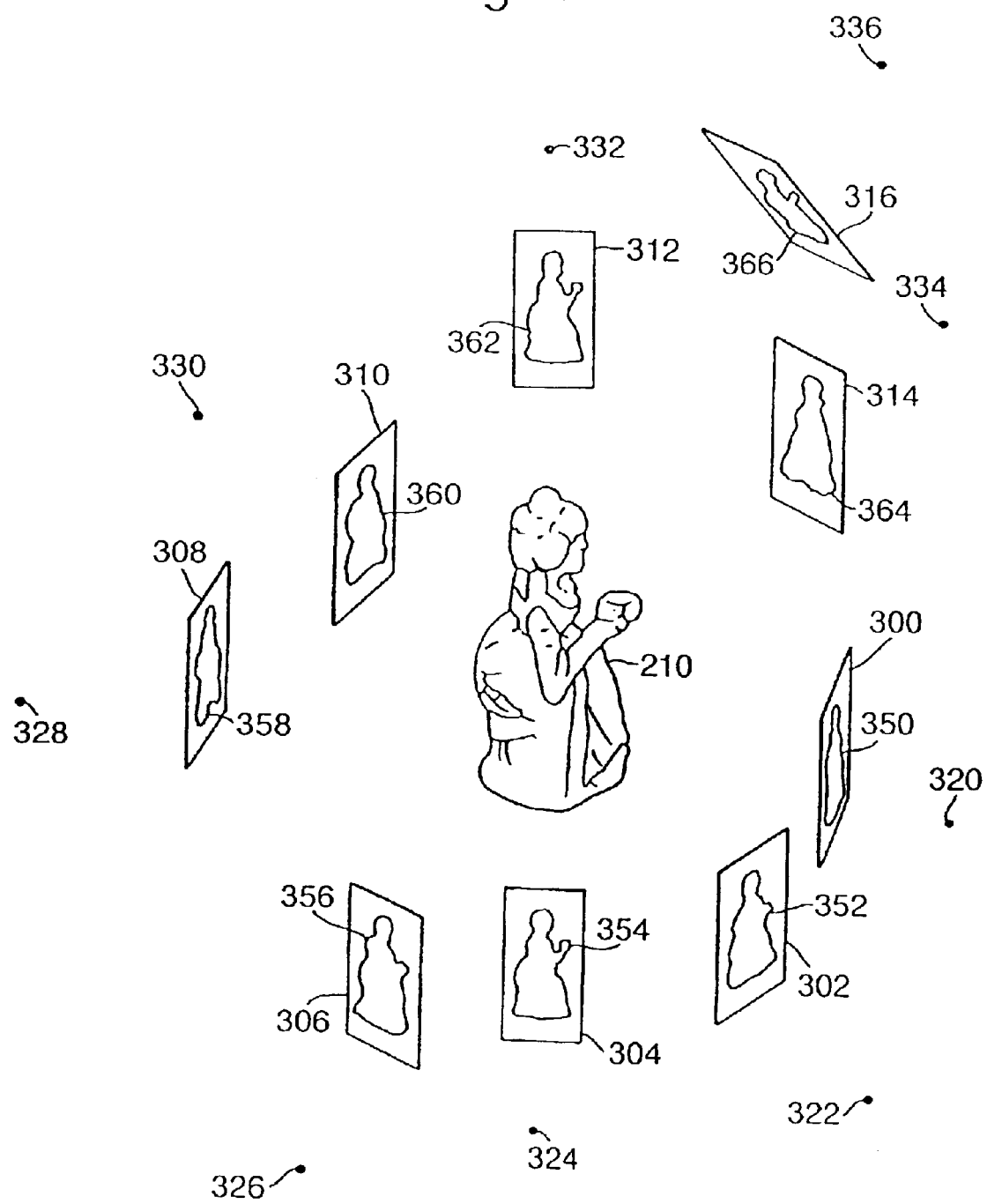
FIG. 7 illustrates the results of the processing performed at steps S6-6 and S6-8 in FIG. 6 for the first set of input images.

FIG. 7 illustrates the results of the processing at steps S6-6 and S6-8 for the first set of input images (with corresponding results being obtained for each other set of input images).

Referring to FIG. 7, at this stage in the processing, the silhouette 350–366 of the subject object 210 in each of the input images 300–316 in the first set has been calculated, and the relative position and orientation of each silhouette in 3D space has been calculated (because each silhouette 350–366 lies in the two-dimensional plane of an input image and the position and orientation of each input image has been calculated by camera calculator 50 at step S5-6). In addition, the position of the focal point 320–336 for each input image is also known from the input data and the calculations by camera calculator 50.

Referring again to FIG. 6, at step S6-10, surface modeller 70 generates a preliminary 3D computer model comprising a polygon mesh representing the surface of the subject object 210, by processing the data for one set of input images (in this embodiment, the first set).

More particularly, referring again to FIG. 7, each silhouette 350–366 defines, together with the focal point position 320–336 of the camera when the image in which the silhouette is situated was recorded, an infinite cone in 3D space which touches the surface of the subject object 210 at (as yet unknown) points in the 3D space (because the silhouette defines the outline of the subject object surface in the image).

In this embodiment, surface modeller 70 performs processing at step S6-10 to determine the volume of 3D space defined by the intersection of the infinite cones defined by all of the silhouettes 350–366, and to represent the intersection volume by a mesh of connecting planar polygons.

This processing may be carried out using the technique described in the proprietor's co-pending U.S. patent application Ser. No. 10/164,435 (the full contents of which are incorporated herein by cross-reference), or may be carried out using a conventional method, for example such as that described in "A Volumetric Intersection Algorithm for 3D-Reconstruction Using a Boundary-Representation" by Martin Löhlein at http://i31www.ira.uka.de/diplomarbeiten/da_martin_loehlein/Reconstruction.html or as described in "An Algorithm for Determining the Intersection of Two Simple Polyhedra" by M. Szilvasi-Nagy in Computer Graphics Forum 3 (1984) pages 219–225.

Alternatively, surface modeller 70 may perform shape-from-silhouette processing for example as described in "Looking to build a model world: automatic construction of static object models using computer vision" by Illingsworth and Hilton in Electronics and Communication Engineering Journal, June 1998, pages 103–113, or "Automatic reconstruction of 3D objects using a mobile camera" by Niem in Image and Vision Computing 17 (1999) pages 125–134. In these methods the intersections of the silhouette cones are calculated and used to generate a "volume representation" of the subject object made up of a plurality of voxels (cuboids). More particularly, 3D space is divided into voxels, and the voxels are tested to determine which ones lie inside the volume defined by the intersection of the silhouette cones. Voxels inside the intersection volume are retained to define a volume of voxels representing the subject object. The volume representation is then converted into a surface model comprising a mesh of connected polygons.

Figure 8:
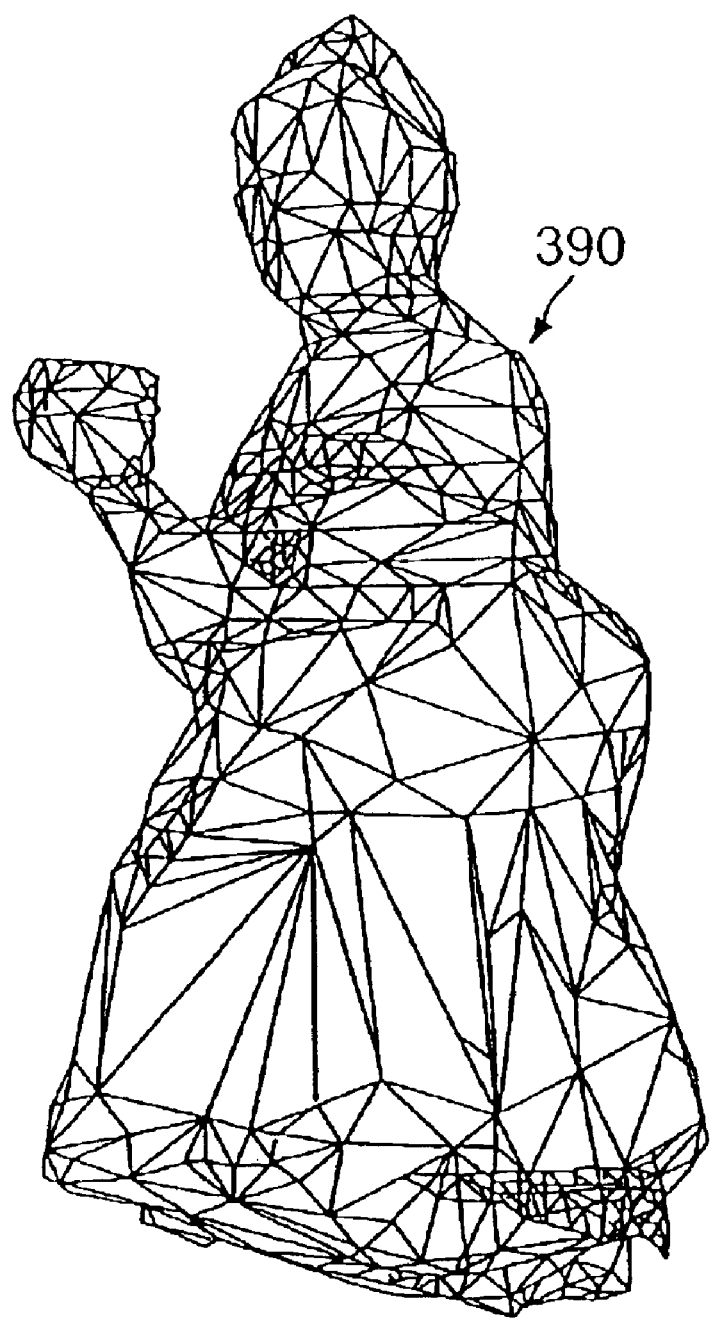
FIG. 8 shows an example of a 3D computer model comprising a polygon mesh representing the surface of a subject object generated as a result of the processing at step S6-10.

The result of the processing at step S6-10 is a polygon mesh 390 representing the surface of the subject object 210, for example as shown in FIG. 8. Because the polygon mesh 390 is generated using the input images 300-316 from the first set of images as described above, features of the subject object 210 not visible in the input images 300–316 (such as features on the base) are not accurately modelled in the polygon mesh. However, the polygon mesh is registered to the input images in the first set (that is, its position and orientation is known relative to the positions and orientations of the input images 300–316), and use of this is made in subsequent processing to register all of the input images and refine the 3D computer model.

More particularly, at step S6-12, registration controller 80 performs processing to register the preliminary 3D computer model 390 generated at step S6-10 with the registered input images in each additional set of images (that is, in each of the sets which was not used at step S6-10 to generate the 3D computer model 390). As will be described below, in this embodiment, the registration by registration controller 80 is carried out in accordance with instructions input by a user.

Figure 9:
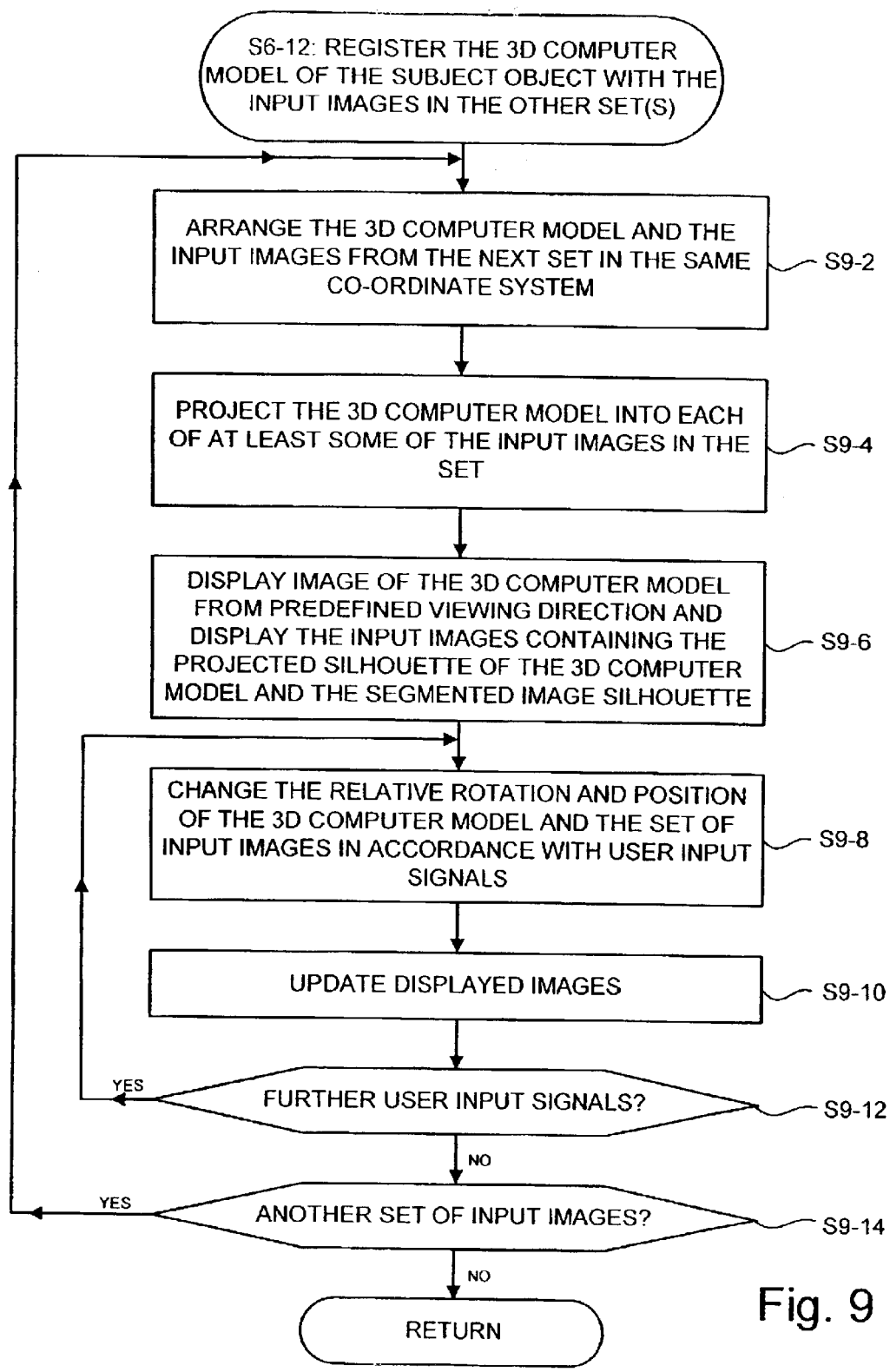
FIG. 9 shows the processing operations performed at step S6-12 in the first embodiment to register the 3D computer model generated at step S6-10 with the input images in other sets.

FIG. 9 shows the processing operations performed by registration controller 80 at step S6-12 in this embodiment to register the 3D computer model 390 generated by surface modeller 70 with each further registered set of images generated by camera calculator 50.

Referring to FIG. 9, at step S9-2, 3D model positioner 82 arranges the preliminary 3D computer model 390 in the same coordinate system as the next registered set of input images (this being the first registered set not used by surface modeller 70 at step S6-10 to generate the 3D computer model 390 the first time step S9-2 is performed). More particularly, 3D model positioner 82 arranges the 3D computer model 390 so that the centre of its base is at the position corresponding to the centre of the calibration pattern on the photographic matter 34. In this way, the position of the 3D computer model 390 is approximately correct relative to the input images in the set currently being considered (because each of the input images shows an image of the subject object 210 at the centre of the calibration pattern as explained previously).

At step S9-4, 3D model projector 84 projects the 3D computer model 390 into each of at least some of the input images in the set currently being considered.

More particularly, in this embodiment, 3D model projector 84 selects three input images having approximately orthogonal viewing directions (or as close to orthogonal as can be selected from the images in the set), and projects the preliminary 3D computer model 390 into the three selected input images.

At step S9-6, 3D model projector 84 controls display processor 110 to display images to the user on display device 4 comprising an image of the 3D computer model 390 from a predefined viewing direction, and each input image selected at step S9-4 showing the projected silhouette (that is, outline) of the 3D computer model 390 together with the segmented image silhouette in the image generated by image data segmentor 60 at step S6-8.

Figure 10:
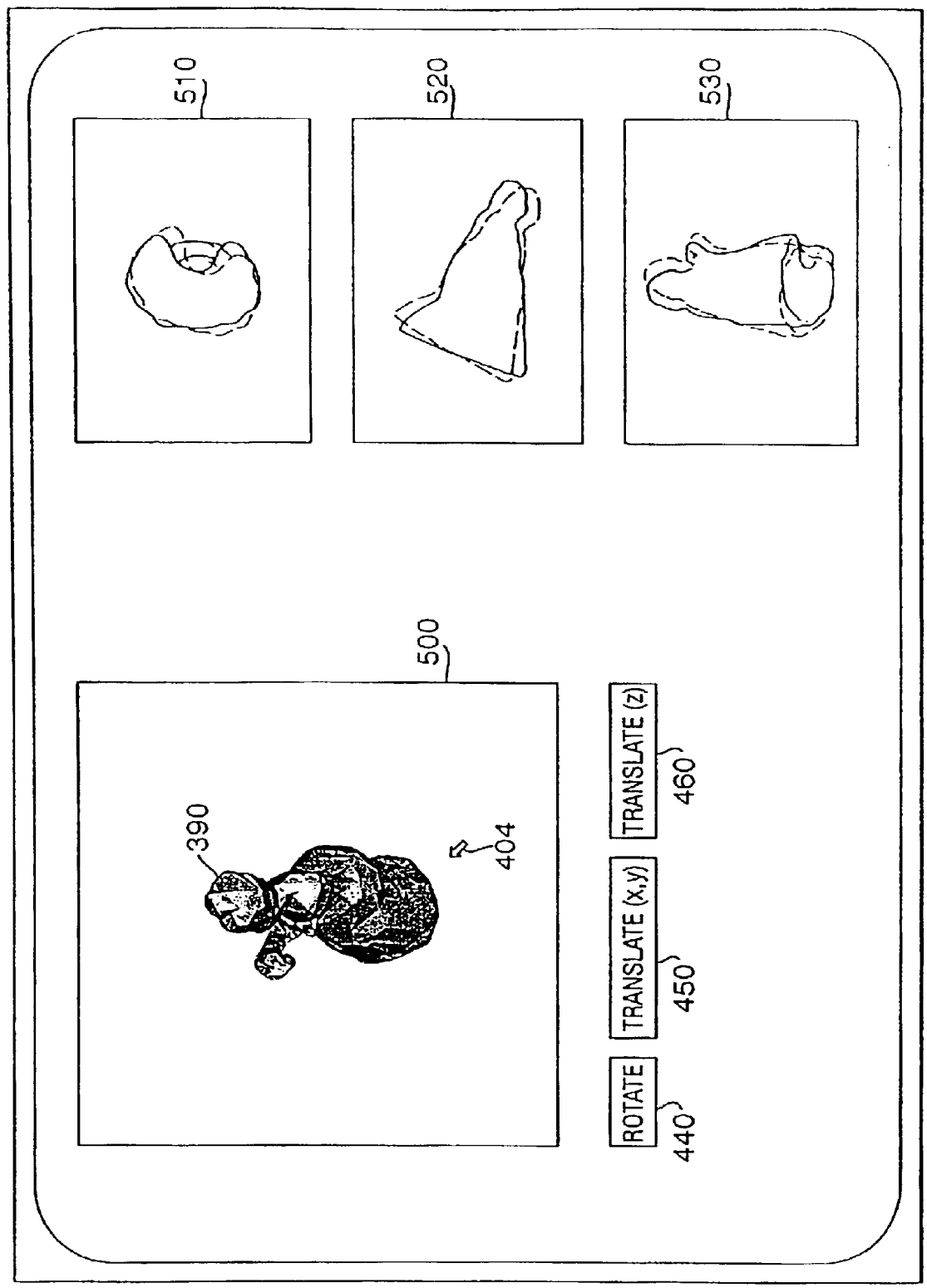
FIG. 10 illustrates the images displayed to the user in the first embodiment at steps S9-6 and S9-10.

FIG. 10 shows an example of the images displayed to the user at step S9-6 in this embodiment.

Referring to FIG. 10, image 500 shows a view of the 3D computer model 390. The computer model 390 is presented to the user as a solid model in image 500 by rendering each polygon in the wire frame model. 390 as a plane surface.

Image 510 shows the silhouette of the 3D computer model 390 when it is projected into the first selected input image together with the silhouette already existing in input image as a result of the processing by image data segmenter 60.

Similarly, image 520 shows the silhouette of the 3D computer model 390 when projected into the second selected input image together with the silhouette in the input image generated by image data segmenter 60, and image 530 shows the silhouette of the 3D computer model 390 when projected into the third selected input image together with the silhouette in the input image produced by image data segmenter 60.

To assist the user in distinguishing between the displayed silhouettes, in each of images 510, 520 and 530, one of the silhouettes is represented by a solid line and the other silhouette is represented by a dotted line.

A "rotate" button 440, a "translate (X,Y)" button 450 and a "translate (Z)" button 460 are provided for selection by the user by pointing and clicking using a pointer 404 and a user-input device 6 such as a mouse.

Following selection of the "rotate" button 440, the user is able to rotate the 3D computer model 390 shown in the image 500 by movement of the pointer 404. More particularly, by clicking once on "rotate" button 440, the user is able to rotate the 3D computer model 390 about the X-coordinate axis, by clicking twice on "rotate" button 440, the user is able to rotate the 3D computer model 390 about the Y-coordinate axis, and by clicking three-times on "rotate" button 440, the user is able to rotate the 3D computer model 390 about the Z-coordinate axis.

Similarly, the user is able to change the position of the model 390 by movement of the pointer 404 following selection of the "translate (X,Y)" button 450 (allowing movement in the X-Y plane) or the "translate (Z)" button 460 (allowing moving in the Z-axis direction), as appropriate.

As will be explained below, as the user rotates and translates the 3D computer model 390, the images 500, 510, 520 and 530 are updated in real-time so that the user can see the effect of the movements as he makes them. In particular, the user can view errors between the alignment of the silhouettes in the images 510, 520 and 530, and therefore can rotate and translate the computer model 390 to minimise the alignment errors, and therefore register the preliminary 3D computer model 390 with the registered set of input images currently being considered. By registering the position and rotation of the 3D computer model 390 to the registered set of images currently being considered, the user also registers the registered set of input images from which the 3D computer model 390 was generated at step S6-10 with the registered set of images currently being considered (because, as explained above, the 3D computer model 390 is registered with the images used at step S6-10 to generate the model 390).

More particularly, referring again to FIG. 9, at step S9-8, rotator 86 and translator 88 change the rotation and position of the 3D computer model 390 relative to the coordinate system of the registered set of input images currently being considered in accordance with input signals from the user generated as described above.

At step S9-10, 3D model projector 84 and display processor 110 update images 500, 510, 520 and 530 displayed to the user to show the results of the changes to the rotation and/or position at step S9-8.

At step S9-12, registration control 80 determines whether further input signals have been received from the user to translate or rotate the preliminary 3D computer model 390. Steps S9-8 to S9-12 are repeated until the user has completed registration of the preliminary 3D computer model 390 to the registered set of input images currently being considered.

At step S9-14, registration controller 80 determines whether there is a further set of registered input images to which the 3D computer model 390 needs to be registered (that is, whether there is a further set of registered input images not used at step S6-10 to generate the 3D computer model 390). Steps S9-2 to S9-14 are repeated until the 3D computer model 390 has been registered with each set of registered input images.

When the 3D computer model 390 has been registered with all of the registered sets of input images, then all of the input images in all sets have been registered with each other. Consequently, knowing the relative position and orientation of each input image, a refined 3D—computer model of the subject object 210 can be generated making use of all the available image data. In this way, parts of the subject object 210 not imaged in the first set of input images (such as the base of the subject object) but imaged in other sets, can be accurately modelled in the final 3D computer model.

Accordingly, referring again to FIG. 6, at step S6-14, surface modeller 70 performs processing to generate a refined 3D computer model of the subject object 210.

In this embodiment, surface modeller 70 generates the refined 3D computer model using all of the registered input images and using the same processing as that performed previously at step S6-10 to generate the preliminary 3D computer model. That is, the preliminary 3D computer model 390 is discarded, and a new 3D computer model is generated using the silhouette data (generated at step S6-8) and the registered positions and orientations of all of the input images, rather than just the first set of registered images. Since this processing has been described previously, it will not be described again here.

At step S6-16, surface texturer 100 processes the input images to generate texture data therefrom for the 3D computer model generated at step S6-14.

More particularly, in this embodiment, surface texturer 100 performs processing in a conventional manner to select each triangle in the 3D computer model generated at step S6-14 and to find the input image "i" which is most front-facing to a selected triangle. That is, the input image is found for which the value $\hat{n}t.\hat{v}i$ is largest, where $\hat{n}t$ is the triangle normal, and $\hat{v}i$ is the viewing direction for the "i"th image. This identifies the input image in which the selected surface triangle has the largest projected area.

The selected surface triangle is then projected into the identified input image, and the vertices of the projected triangle are used as texture coordinates to define an image texture map.

Other techniques that may be used by surface texturer 100 to generate texture data at step S6-16 are described in UK patent applications GB-A-2369541 and GB-A-2369260, and co-pending U.S. patent application Ser. No. 09/981,844 (U.S. 20020085748A1), the full contents of which are incorporated herein by cross-reference.

The result of performing the processing described above is a 3D computer model of the subject object 210 modelling all of the features visible in the input images, together with texture coordinates defining image data from the input images to be rendered onto the model.

Data defining the 3D computer model generated at step S6-14 is stored in output data store 120 together with texture data. The stored texture data may comprise data defining each of the input images to be used for texture data together with data defining the texture coordinates in the input images. Alternatively, the pixel data to be used as texture data may be extracted from the input images and stored in output data store 120.

At step S6-18, central controller 20 outputs data defining the 3D computer model 390 generated at step S6-14 and, optionally, the texture data from output data store 120, for example as data stored on a storage device such as disk 122 or as a signal 124 (FIG. 1). In addition, or instead, central controller 20 causes display processor 110 to display on display device 4 an image of the 3D computer model generated at step S6-14 rendered with the texture data generated at step S6-16 in accordance with a viewpoint input by the user, for example using a user input device 6.

SECOND EMBODIMENT

A second embodiment of the invention will now be described.

In the first embodiment described above, registration controller 80 registers the preliminary 3D computer model 390 at step S6-12 with the other registered sets of input images on the basis of signals input from a user defining changes to the position and orientation of the 3D computer model 390 relative to each registered set of input images.

However, the registration of the preliminary 3D computer model 390 to each of the other registered sets of input images may be carried out automatically by registration controller 80 without input from the user, as will now be described in the second embodiment.

The components of the second embodiment and the processing operations performed thereby are the same as those in the first embodiment, with the exception of the components of the registration controller 80 and the processing operations performed by these components. Accordingly, only these differences will be described below.

Figure 11:
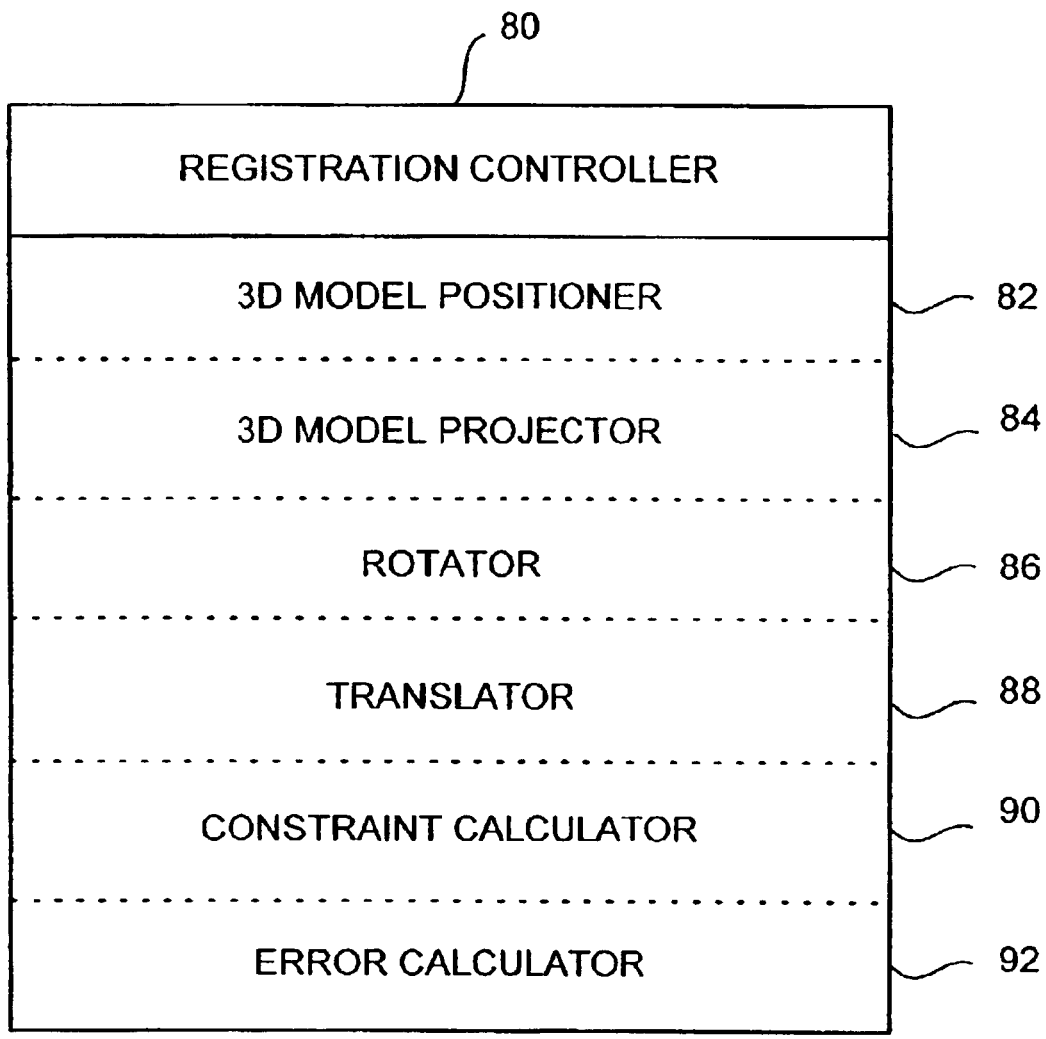
FIG. 11 shows the functional components of the registration controller from the processing apparatus in a second embodiment.

FIG. 11 shows the functional components of the registration controller 80 in the third embodiment.

Referring to FIG. 11, the registration controller 80 of the second embodiment comprises 3D model positioner 82, 3D model projector 84, rotator 86 and translator 88, as in the third embodiment. In addition, however, registration controller 80 also includes a constraint calculator 90 and an error calculator 92, the processing functions of which will be described below.

Figure 12A:
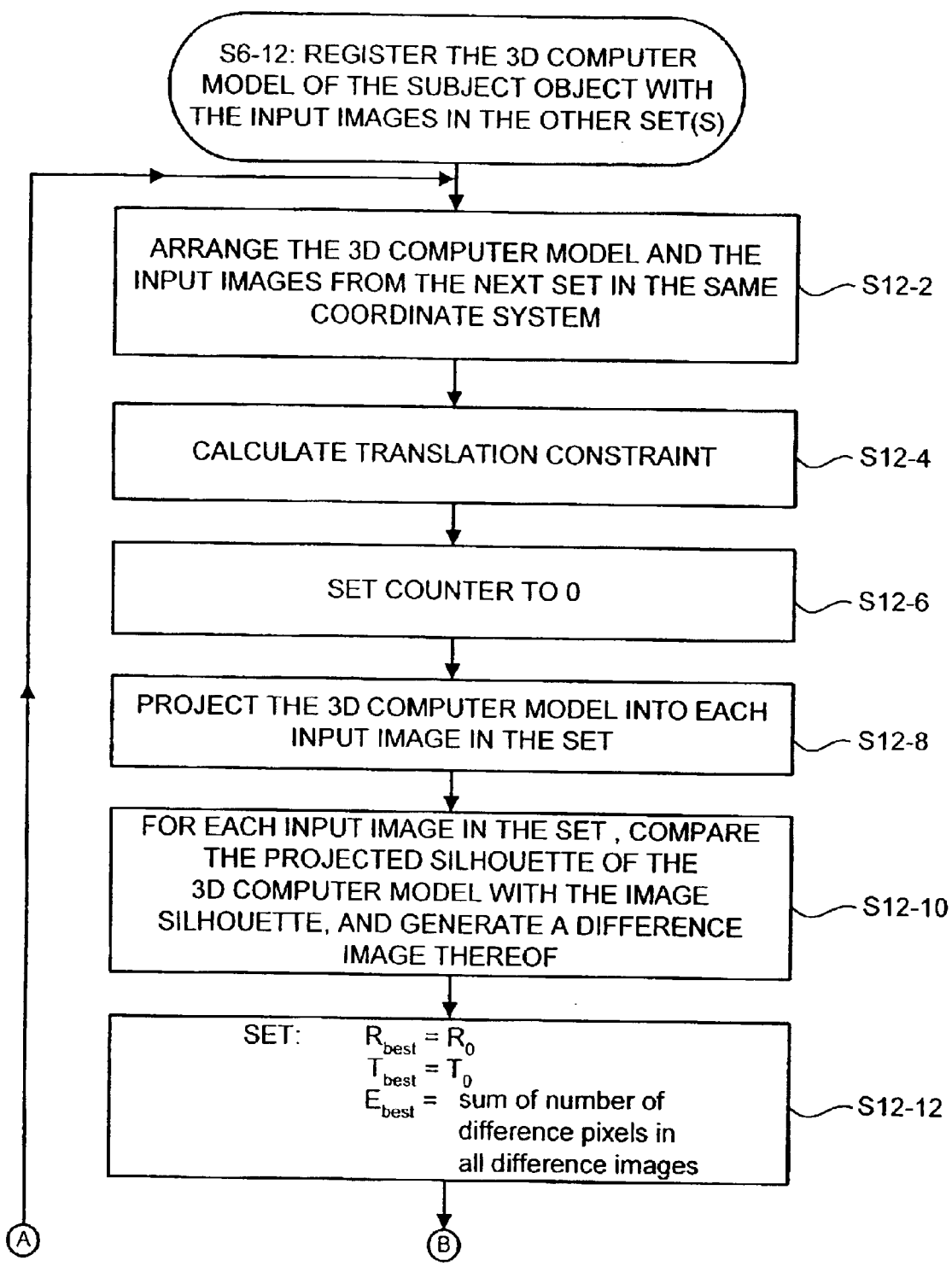
FIGS. 12a, 12b and 12c, shows the processing operations performed at step S6-12 in the second embodiment to register the 3D computer model generated at step S6-10 with the input images in other sets.
Figure 12B:
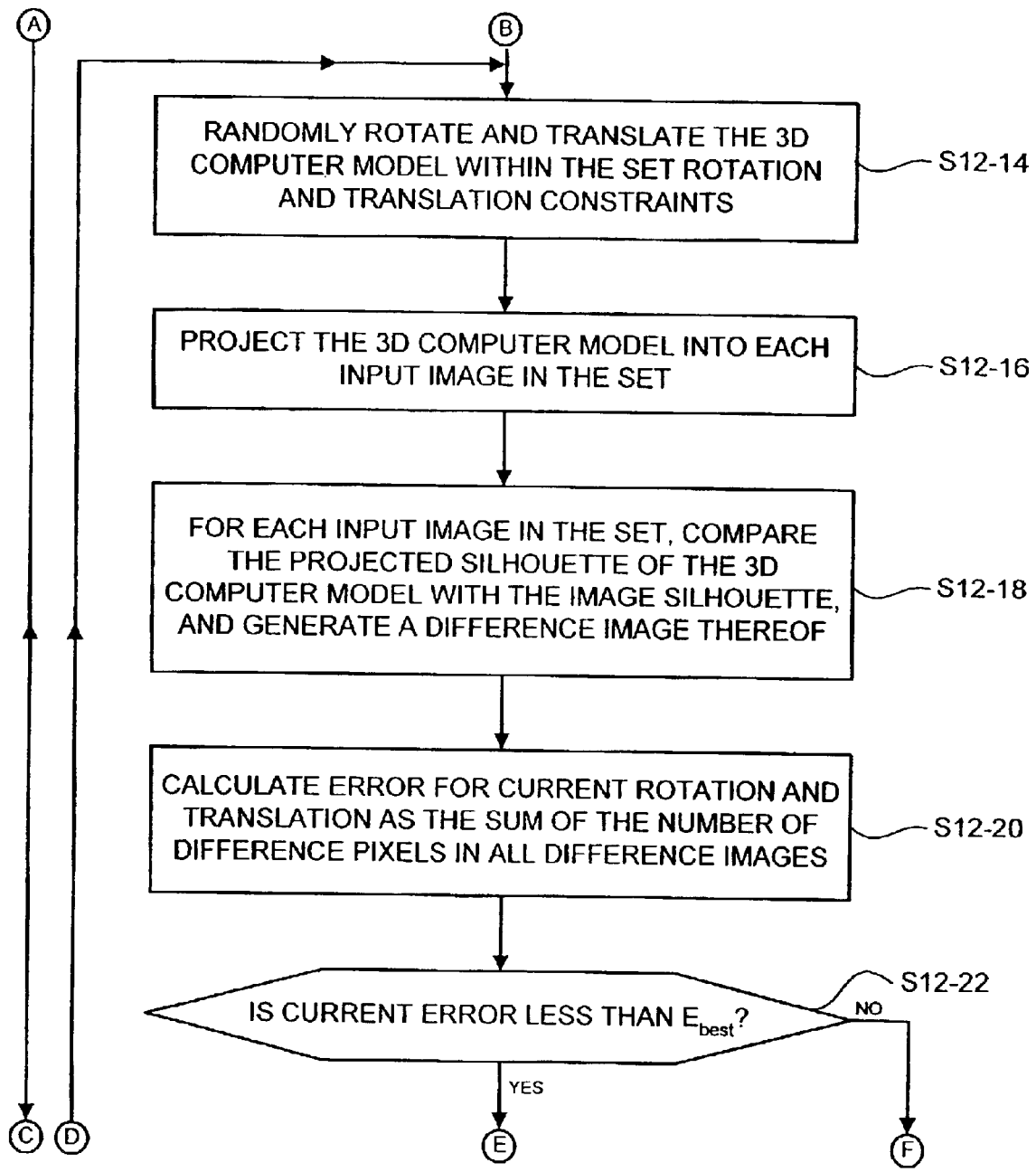
Figure 12C:
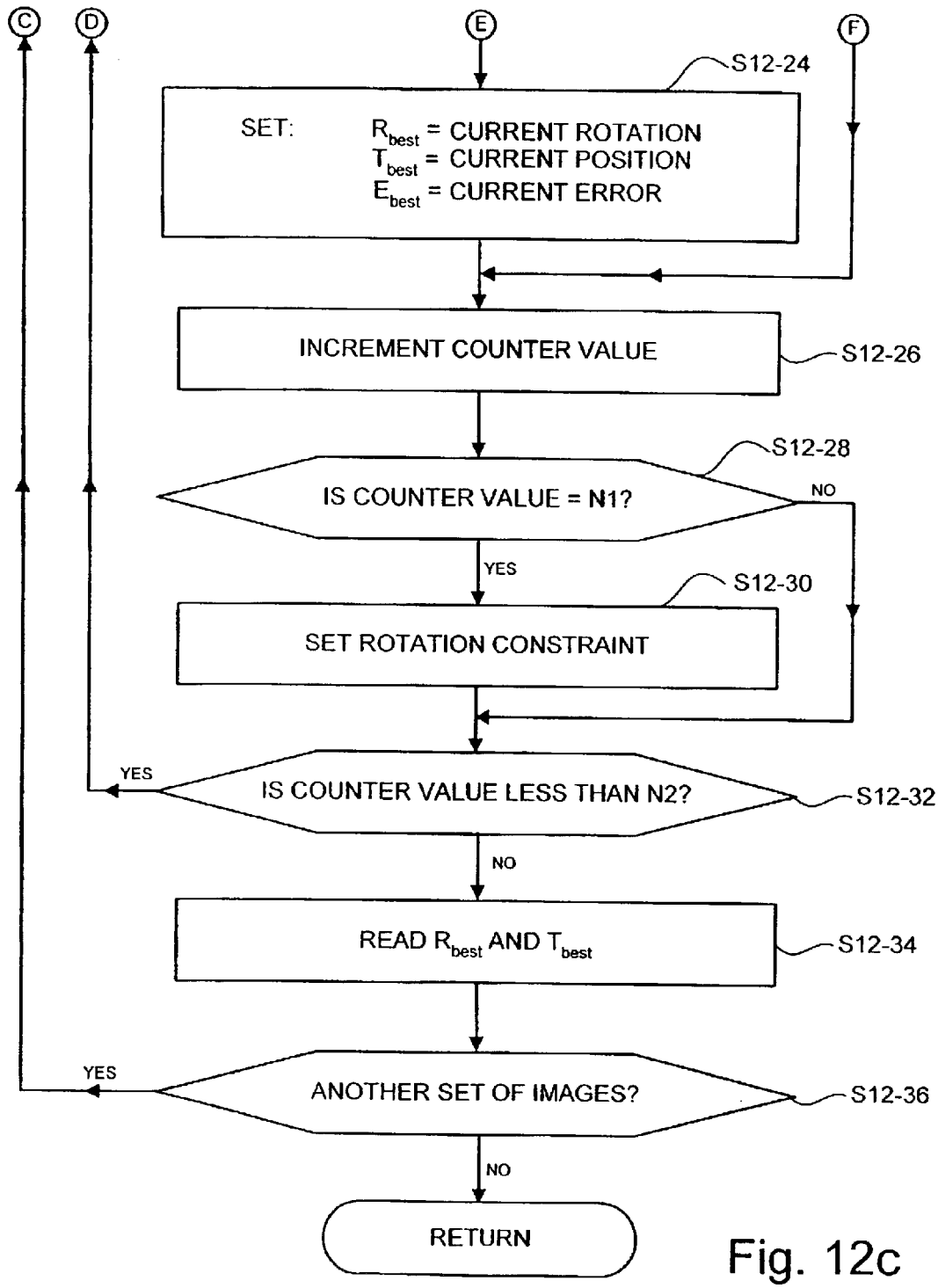

FIG. 12 shows the processing operations performed by the components of the registration controller 80 at step S6-12 in the second embodiment to register the preliminary 3D computer model 390 with each set of registered input images generated by camera calculator 50 and not used at step S6-10 to generate the preliminary 3D computer model 390.

Referring to FIG. 12, at step S12-2, 3D model positioner 82 arranges the preliminary 3D computer model 390 in the same coordinate system as the next set of registered input images to which the 3D computer model 390 is to be registered (this being the first such set the first time step S12-2 is performed). More particularly, as in the first embodiment, 3D model positioner 82 places the preliminary 3D computer model 390 in the coordinate system so that the centre of its base is at a position corresponding to the centre of the calibration pattern in the photographic mat 34. In this way, for the reasons explained previously, the position of the preliminary 3D computer model 390 is approximately correct for the registered set of input images currently being considered, although its rotation is, at this stage, arbitrary.

At step S12-4, error calculator 92 calculates a limit within which the preliminary 3D computer model 390 can be translated in subsequent processing. This limit is imposed since, as described above, the position of the preliminary 3D computer model 390 is approximately correct as a result of the processing at step S12-2, and therefore a limit can be placed on subsequent translation of the 3D computer model 390, decreasing the processing time to register the 3D computer model 390 with the registered set of input images currently selected for processing.

In this embodiment, error calculator 92 sets the translation constraint at step S12-4 to be 10% of the size of the preliminary 3D computer model 390, with the size being calculated as the square root of the maximum eigenvalue of the preliminary 3D computer model 390. In subsequent processing, the preliminary 3D computer model 390 is not allowed to move by more than this amount in any direction from its position at that time.

At step S12-6 registration controller 80 sets the value of a counter, indicating the number of processing iterations carried out, to 0.

At step S12-8, 3D model projector 84 projects the preliminary 3D computer model 390 (having the position and orientation arranged at step S12-2) into each of the registered input images in the set currently being considered.

At step S12-10, error calculator 92 performs processing for each input image in the set to compare the projected silhouette of the 3D computer model 390 (generated at step S12-8) with the silhouette present in the input image as a result of the processing at step S6-8 by image data segmenter 60. More particularly, in this embodiment, error calculator 92 generates a difference image for each input image in the set by setting the value of each pixel in the input image to the value 1 if the pixel is within one, but not both, of the silhouettes, and to the value 0 otherwise (that is, if the pixel is within both silhouettes or is outside both silhouettes). In this way, pixels in each difference image are set to the value 1 at every position where the silhouette generated at step S12-8 and the silhouette generated at step S6-8 do not align. Consequently, pixel values of 1 in each difference image define positions where the silhouette of the preliminary 3D computer model 390 is inconsistent with the silhouette of the imaged subject object 210 in the input image.

At step S12-12, the value of a variable $R_{best}$ indicating the current best rotation of the preliminary 3D computer model 390 is set to be the rotation of the preliminary 3D computer model 390 set at step S12-2. Similarly, the value of a variable $T_{best}$ indicating the current best position (translation) of the preliminary 3D computer model 390 is set to be the position defined at step S1-22. The value of a variable $E_{best}$ indicating the error in the registration of the preliminary 3D computer model 390 with the registered input images in the set currently being considered is set to be the sum of the number of pixels of value 1 in all of the difference images generated at step S12-10.

As will now be described, in subsequent processing, registration controller 80 performs processing to rotate and translate the preliminary 3D computer model 390 to reduce the value of $E_{best}$.

More particularly, at step S12-14, rotator 86 and translator 88 randomly rotate and translate the preliminary 3D computer model 390 within the translation constraint set at step S12-4 and any rotation constraint (there being no rotation constraint for a first predetermined number of iterations of step S12-14, but, as will be described below, such a constraint being introduced after the first predetermined number of iterations have been performed).

At step S12-16, 3D model projector 84 projects the preliminary 3D computer model 390 following its rotation and translation at step S12-14 into each input image in the set currently selected.

At step S12-18, error calculator 92 processes each input image in the set to compare the silhouette of the projected 3D computer model 390 with the silhouette generated by image data segmenter 60, and generates a difference image from the silhouettes. The processing at step S12-18 corresponds to that of step S12-10 and accordingly will not be described again here.

At step S12-20, error calculator 92 calculates a registration error for the current rotation and translation of the preliminary 3D computer model 390 (that is, the rotation and translation set at step S12-14). 14). More particularly, in the same way as at step S12-12, error calculator 92 calculates the error as the sum of the number of pixels of value 1 in all of the difference images generated at step S12-18.

At step S12-22, error calculator 92 determines whether the current error determined at step S12-20 is less than the stored best error $E_{best}$.

If it is determined at step S12-22 that the current error is less than $E_{best}$, then, at step S12-24, $R_{best}$ is set to the current rotation, $T_{best}$ is set to the current position and $E_{best}$ is set to the current error.

On the other hand, if it is determined at step S12-22 that the current error is not less than $E_{best}$, then step S12-24 is omitted.

At step S12-26, the value of the counter indicating the number of processing iterations is incremented by 1.

At step S12-28, the value of the counter is read to determine whether it is equal to a predetermined value, N1, which, in this embodiment, is set to 5,000.

If it is determined at step S12-28 that the value of the counter is equal to N1, then, at step S12-30, constraint calculator 90 sets a rotation constraint for subsequent rotations of the preliminary 3D computer model 390 at step S12-14. More particularly, in this embodiment, constraint calculator 90 sets a rotation constraint of 10° so that, when step S12-14 is performed on subsequent iterations, the preliminary 3D computer model 390 can only be rotated within ±10° of its current rotation. In this way, a rotation constraint is introduced when sufficient iterations of steps S12-4 to S12-32 have been carried out so that the rotation of the 3D computer model 390 should be approximately correct. Accordingly, accuracy is improved because rotation of the 3D computer model 390 in subsequent processing iterations is restricted, preventing large random rotations at step S12-14 which would not improve the accuracy of the registration.

On the other hand, if it is determined at step S12-28 that the value of the counter is less than or greater than the predetermined value N1, then step S12-30 is omitted.

At step S12-32, the value of the counter is read to determine whether it is less than a second predetermined value, N2, which, in this embodiment, is set to 10,000.

Steps S12-14 to S12-32 are repeated to randomly rotate and translate the preliminary 3D computer model 390 and to test the resulting registration with the registered set of input images, until it is determined at step S12-32 that the number of iterations of this processing has reached the predetermined threshold N2.

At step S12-34, the stored values $R_{best}$ and $T_{best}$ are read, these values representing the position and orientation generated in all iterations of step S12-14 which give the best registration of the preliminary 3D computer model 390 with the registered set of input images currently being considered.

At step S12-36, registration controller 80 determines whether there is another registered set of input images with which the preliminary 3D computer model 390 is to be registered. Steps S12-2 to S12-36 are repeated to register the preliminary 3D computer model 390 with every registered set of input images in the way described above.

Modifications and Variations

Many modifications and variations can be made to the embodiments described above within the scope of the claims.

For example, in the embodiments described above, the input image data comprises "still" images of the subject object 210. However, the input images may comprise frames of image data from a video camera.

In the embodiments described above, at step S6-4, data input by a user defining the intrinsic parameters of the camera is stored. However, instead, default values may be assumed for some, or all, of the intrinsic camera parameters, or processing may be performed to calculate the intrinsic parameter values in a conventional manner, for example as described in "Euclidean Reconstruction From Uncalibrated Views" by Hartley in Applications of Invariance in Computer Vision, Mundy, Zisserman and Forsyth eds, pages 237–256, Azores 1993.

In the embodiments described above, the second set of input images stored at step S6-4 contains a plurality of images 380, 382, 384. However, the second set may contain just a single image. In this case, the single image can be recorded of the subject object 210 alone, without the photographic mat, and it is not necessary to perform processing at step S6-6 to calculate the imaging position and orientation of the single image.

In the embodiments described above, all of the input images stored at step S6-4 comprise images of the subject object 210 on the photographic mat 34, and the processing by camera calculator 50 comprises processing to match features from the calibration pattern on the photographic mat 34 in the images with stored data defining the calibration pattern, so that the position and orientation of each input image is calculated relative to a reference position and orientation of the calibration pattern. However, instead, camera calculator 50 may perform processing to match features of the calibration pattern between images (instead of between an image and a stored pattern) to determine the relative positions and orientations of the input images. For example, a technique as described with reference to FIGS. 53 and 54 in PCT Application GB00/04469 (WO-A-01/39124) may be used. Alternatively, the input images stored at step S6-4 may comprise images of the subject object 210 alone, without the photographic mat, and camera calculator 50 may perform processing at step S6-6 to calculate the relative positions and orientations of the input images by matching features on the subject object 210 itself (rather than matching features in the calibration pattern), for example as described in EP-A-0898245. In addition, camera calculator 50 may calculate the relative positions and orientations of the input images at step S6-6 using matching features in the images identified by the user (for example, by pointing and clicking to identify the position of the same feature in different images).

Of course, the method used by camera calculator 50 at step S6-6 to calculate the positions and orientations of the input images may be different for different sets of the input images.

In the embodiments described above, surface modeller 70 generates the preliminary 3D computer model 390 of the subject object 210 by processing the input images using the silhouettes 350–366 generated by image data segmenter 60. However, instead, surface modeller 70 may generate the preliminary 3D computer model from the input images using other processing techniques. For example, the technique described in EP-A-0898245 may be used.

In the embodiments described above, surface modeller 70 generates the final 3D computer model at step S6-14 by discarding the preliminary 3D computer model 390 and generating a new 3D computer model using all of the registered input images. However, instead, surface modeller 70 may generate the final 3D computer model in other ways. For example, surface modeller 70 may retain the preliminary 3D computer model 390, and generate a respective additional 3D computer model from each of the other registered set of input images generated by camera calculator 50 at step S6-6 (the processing to generate each respective additional 3D computer model being the same as that performed at step S6-10 to generate the preliminary 3D computer model from the first set of registered input images). The relative positions and orientations of the registered sets of input images is calculated at step S6-12. Consequently, because each 3D computer model is inherently registered with one set of registered input images, the relative positions and orientations of all of the 3D computer models of the subject object are known as a result of the processing at step S6-12. Accordingly, surface modeller 70 may generate the final 3D computer model by calculating the volume intersection of all of the generated 3D computer models. This may be calculated in a conventional manner, or may be calculated using the method described in the second embodiment of the proprietor's co-pending U.S. patent application Ser. No. 10/164,435 (the full contents of which are incorporated herein by cross-reference).

In the first embodiment described above, images 510, 520 and 530 (FIG. 10) showing the silhouettes are generated from orthogonal viewing directions (or as close to orthogonal as can be selected from the input images). However, images 510, 520 and 530 showing the silhouettes may be generated from non-orthogonal viewing directions.

In the first embodiment described above, at step S9-8, the user rotates and translates the preliminary 3D computer model 390 relative to the coordinate system in which the input images are registered. Similarly, in the second embodiment at step S12-14, the preliminary 3D computer model 390 is rotated and translated within the coordinate system of a registered set of input images. However, instead, the coordinate system of the registered set of input images may be translated and rotated relative to the preliminary 3D computer model 390, with the same effect.

In the embodiments described above, processing is performed by a computer using processing routines defined by programming instructions. However, some, or all, of the processing could, of course, be performed using hardware.

What is claimed is:

1. A method of processing image data defining images of a subject object to generate data defining a three-dimensional computer model of the subject object, comprising:

calculating the imaging positions and orientations of at least some of the images to generate a plurality of respective registered sets of images, at least one of the sets containing a plurality of images and each other set containing at least one image, and the images within each respective set which contains more than one image having imaging positions and orientations registered to each other;

generating a preliminary three-dimensional computer model of the subject object using at least some of the images from a first registered set containing a plurality of images;

registering all of the respective registered sets of images by registering the preliminary three-dimensional computer model with each registered set of images other than the first set, the registration with each set being carried out by projecting the preliminary three-dimensional computer model into at least one image in the set; and generating a refined three-dimensional computer model of the subject object using the calculated registration of the different sets.

2. A method according to claim 1, wherein the imaging positions and orientations of the images in at least one set are calculated relative to a predetermined calibration pattern.

3. A method according to claim 1, wherein the imaging positions and orientations of the images in at least one set are calculated relative to each other in dependence upon the positions of matching features in different images.

4. A method according to claim 1, wherein the imaging positions and orientations of the images in at least one set are calculated in dependence upon features in the images identified by a user.

5. A method according to claim 1, wherein the imaging positions and onentations of the images in at least one set are calculated by processing the image data to detect features in different images, and calculating the relative imaging positions and orientations in dependence upon the detected features.

6. A method according to claim 1, wherein the registration of the preliminary three-dimensional computer model with each registered set of images comprises iteratively projecting the preliminary three-dimensional computer model into at least one image in the set and changing the relative position and orientation of the preliminary three-dimensional computer model and the registered set of images.

7. A method according to claim 1, wherein the registration of the preliminary three-dimensional computer model with at least one registered set of images comprises:

projecting the preliminary three-dimensional computer model into at least one image in the set;

generating image data for display showing the projection of the preliminary three-dimensional computer model relative to the imaged subject object in each image into which the preliminary three-dimensional computer model is projected;

changing the relative position and orientation of the preliminary three-dimensional computer model and the registered set of images in accordance with signals input by a user; and updating the image data for display as the relative position and orientation of the preliminary three-dimensional computer model and the registered set of images is changed.

8. A method according to claim 7, wherein the image data generated for display comprises image data showing the silhouette of the projected preliminary three-dimensional computer model relative to the silhouette of the imaged subject object in each image into which the preliminary three-dimensional computer model is projected.

9. A method according to claim 1, wherein the registration of the preliminary three-dimensional computer model with at least one registered set of images comprises:

translating and rotating at least one of the preliminary three-dimensional computer model and the registered set of images;

for different translations and rotations:
projecting the preliminary three-dimensional computer model into at least one image in the set; and
comparing the projection of the preliminary three-dimensional computer model with image data of the subject object in each image into which the three-dimensional computer model is projected, to calculate registration errors thereof; and determining the registration of the three-dimensional computer model with the registered set of images in dependence upon the registration errors.

10. A method according to claim 9, wherein the silhouette of the projected preliminary three-dimensional computer model and the silhouette of the subject object are compared in each image into which the preliminary three-dimensional computer model is projected, and the registration errors are calculated in dependence upon the size of non-overlapping portions of the silhouettes.

11. A method according to claim 1, wherein the refined three-dimensional computer model is generated by generating at least one further three-dimensional computer model of the subject object and combining each further three-dimensional computer model with the preliminary three-dimensional computer model.

12. A method of generating a three-dimensional computer model of a subject object, comprising:

recording a first set of images of the subject object and a calibration pattern from different imaging positions and directions, the subject object and the calibration pattern having a first relative position and orientation for each image in the first set;

changing the relative position and orientation of the subject object and calibration pattern to a second relative position and orientation;

recording a second set of images comprising at least one further image of the subject object and calibration pattern, the subject object and calibration pattern having the second relative position and orientation for each image in the second set;

processing image data defining the images in the first set to calculate the imaging portions and directions thereof relative to the calibration pattern in dependence upon the positions of the calibration pattern features in the images;

if the second set of images comprises two or more images, processing image data defining the images in the second set to calculate the imaging positions and directions thereof relative to the calibration pattern in dependence upon the positions of the calibration pattern features in the images;

processing image data defining at least some of the images in the first set and the calculated imaging positions and directions thereof to generate data defining a preliminary three-dimensional computer model of the subject object having a position and orientation relative to the images in the first set;

calculating the relationship between the imaging positions and orientations of the images in the first set and the imaging positions and orientations of the images in the second set by changing the relative position and orientation of the preliminary three-dimensional computer model and the images in the second set to determine the position and orientation which substantially aligns the preliminary three-dimensional computer model with the image of the subject object in at least one image in the second set; and generating data defining a refined three-dimensional computer model of the subject object by processing data defining images from the first and second sets and the calculated relative imaging positions and orientations thereof.

13. A method of generating a three-dimensional computer model of a subject object by processing data defining a first set of images of the subject object and a calibration pattern recorded from different imaging positions and directions, the subject object and the calibration pattern having a first relative position and orientation for each image in the first set, and data defining a second set of images comprising at least one further image of the subject object and calibration pattern, the subject object and calibration pattern having a second relative position and orientation for each image in the second set, the method comprising:

processing image data defining the images in the first set to calculate the imaging portions and directions thereof relative to the calibration pattern in dependence upon the positions of the calibration pattern features in the images;

if the second set of images comprises two or more images, processing image data defining the images in the second set to calculate the imaging positions and directions thereof relative to the calibration pattern in dependence upon the positions of the calibration pattern features in the images;

processing image data defining at least some of the images in the first set and the calculated imaging positions and directions thereof to generate data defining a preliminary three-dimensional computer model of the subject object having a position and orientation relative to the images in the first set;

calculating the relationship between the imaging positions and orientations of the images in the first set and the imaging positions and orientations of the images in the second set by changing the relative position and orientation of the preliminary three-dimensional computer model and the images in the second set to a position and orientation which substantially aligns the preliminary three-dimensional computer model with the image of the subject object in at least one image in the second set; and generating data defining a refined three-dimensional computer model of the subject object by processing data defining images from the first and second sets and the calculated relative imaging positions and orientations thereof.

14. A method according to claim 1, 12 or 13, further comprising generating a signal conveying the refined three-dimensional computer model of the subject object.

15. A method according to claim 14, further comprising generating a recording of the refined three-dimensional computer model of the subject object by recording the signal either directly or indirectly.

16. Apparatus operable to process image data defining images of a subject object to generate data defining a three-dimensional computer model of the subject object, comprising:

an image registration calculator operable to process image data defining a plurality of images of a subject object to calculate the imaging positions and directions of at least some of the images to generate a plurality of image sets, each respective set comprising either a plurality of images having calculated imaging positions and orientations in registration or a single image;

a preliminary three-dimensional computer model generator operable to generate a preliminary three-dimensional computer model of the subject object having a position and orientation in registration with the images in a first of the sets;

an image-model registration calculator operable to register the imaging positions and directions of the first set of images with the imaging positions and directions of other sets of images, comprising:

a three-dimensional computer model projector operable to project the preliminary three-dimensional computer model into at least one image in each of the other sets; and a position and orientation changer operable to change the relative position and orientation of the preliminary three-dimensional computer model and each respective set of images; and a refined three-dimensional computer model generator operable to generate a refined three-dimensional computer model of the subject object in dependence upon the determined registration of different image sets.

17. Apparatus according to claim 16, wherein the image registration calculator is operable to calculate the relative imaging positions and directions of images to generate a registered set of images by calculating the imaging position and orientation of each image relative to a predetermined calibration pattern.

18. Apparatus according to claim 16, wherein the image registration calculator is operable to calculate the relative imaging positions and directions of images to generate a registered set of images in dependence upon positions of corresponding features in the images.

19. Apparatus according to claim 16, wherein the image registration calculator is operable to calculate the relative imaging positions and directions of images to generate a registered set of images in dependence upon features in the images identified by a user.

20. Apparatus according to claim 16, wherein the image registration calculator is operable to process the image data to detect features in the images, and to calculate the relative imaging positions and directions of images to generate a registered set of images in dependence upon the detected features.

21. Apparatus according to claim 16, wherein the image-model registration calculator is operable to perform iteratively the operations of projecting the preliminary three-dimensional computer model into at least one image in a registered set of images and changing the relative position and orientation of the preliminary three-dimensional computer model and the registered set of images.

22. Apparatus according to claim 16, wherein the image-model registration calculator comprises:

a three-dimensional computer model projector operable to project the preliminary three-dimensional computer model into at least one image in a registered set of images;

an image data generator operable to generate image data for display showing the projection of the preliminary three-dimensional computer model relative to the subject object in each image into which the preliminary three-dimensional computer model is projected; and a position and orientation changer operable to change the relative position and orientation of the preliminary three-dimensional computer model and the registered set of images in accordance with signals input by a user;

wherein the image data generator is arranged to generate updated image data for display in response to changes of the relative position and orientation of the three-dimensional computer model and the registered set of images.

23. Apparatus according to claim 22, wherein the image data generator is operable to generate image data for display showing the silhouette of the projected three-dimensional computer model relative to the silhouette of the imaged subject object in each image into which the three-dimensional computer model is projected.

24. Apparatus according to claim 16, wherein the image-model registration calculator comprises:

a three-dimensional computer model projector operable to project the preliminary three-dimensional computer model into at least one image in a registered set of images;

an alignment difference calculator operable to compare the projection of the preliminary three-dimensional computer model with the image of the subject object in each image into which the three-dimensional computer model is projected, to calculate alignment differences thereof;

a position and orientation changer operable to change the relative position and orientation of the preliminary three-dimensional computer model and the registered set of images; and a registration position and orientation calculator operable to determine the registration position and orientation of the preliminary three-dimensional computer model and the registered set of images in dependence upon the calculated alignment differences.

25. Apparatus according to claim 24, wherein the alignment difference calculator is operable to compare the silhouette of the projected preliminary three-dimensional computer model and the silhouette of the image of the subject object in each image into which the preliminary three-dimensional computer model is projected, and to calculate the alignment differences in dependence upon the areas which lie within one, but not both, of the silhouettes.

26. Apparatus according to claim 16, wherein the refined three-dimensional computer model generator is operable to generate at least one further three-dimensional computer model of the subject object, and to combine each further three-dimensional computer model with the preliminary three-dimensional computer model to generate the refined three-dimensional computer model.

27. Apparatus operable to generate a three-dimensional computer model of a subject object by processing data defining a first set of images of the subject object and a calibration pattern recorded from different imaging positions and directions, the subject object and the calibration pattern having a first relative position and orientation for each image in the first set, and data defining a second set of images comprising at least one further image of the subject object and calibration pattern, the subject object and calibration pattern having a second relative position and orientation for each image in the second set, the apparatus comprising:

an image position and direction calculator operable to process image data defining images to calculate the imaging portions and directions thereof relative to the calibration pattern in dependence upon the positions of the calibration pattern features in the images, the image position and direction calculator being operable to:
process image data defining the images in the first set to calculate the imaging positions and directions thereof relative to the calibration pattern; and
if the second set of images comprises two or more images, process image data defining the images in the second set to calculate the imaging positions and directions thereof relative to the calibration pattern;
a preliminary three-dimensional computer model generator operable to process image data defining at least some of the images in the first set and the calculated imaging positions and directions thereof to generate data defining a preliminary three-dimensional computer model of the subject object having a position and orientation relative to the images in the first set;
an image-set-relationship calculator operable to calculate the relationship between the imaging positions and orientations of the images in the first set and the imaging positions and orientations of the images in the second set by changing the relative position and orientation of the preliminary three-dimensional computer model and the images in the second set to a position and orientation which substantially aligns the preliminary three-dimensional computer model with the image of the subject object in at least one image in the second set; and
a refined three-dimensional computer model generator operable to generate data defining a refined three-dimensional computer model of the subject object by processing data defining images from the first and second sets and the calculated relative imaging positions and orientations thereof.

28. Apparatus for processing image data defining images of a subject object to generate data defining a three-dimensional computer model of the subject object, comprising:
image registration means for processing image data defining a plurality of images of a subject object to calculate the imaging positions and directions of at least some of the images to generate a plurality of image sets, each respective set comprising either a plurality of images having calculated imaging positions and orientations in registration or a single image;
means for generating a preliminary three-dimensional computer model of the subject object having a position and orientation in registration with the images in a first of the sets;
image-model registration means for registering the imaging positions and directions of the first set of images with the imaging positions and directions of other sets of images, comprising:
means for projecting the preliminary three-dimensional computer model into at least one image in each of the other sets; and
means for changing the relative position and orientation of the preliminary three-dimensional computer model and each respective set of images; and
means for generating a refined three-dimensional computer model of the subject object in dependence upon the determined registration of different image sets.

29. Apparatus for generating a three-dimensional computer model of a subject object by processing data defining a first set of images of the subject object and a calibration pattern recorded from different imaging positions and directions, the subject object and the calibration pattern having a first relative position and orientation for each image in the first set, and data defining a second set of images comprising at least one further image of the subject object and calibration pattern, the subject object and calibration pattern having a second relative position and orientation for each image in the second set, the apparatus comprising:
image position and direction calculating means for processing image data defining images to calculate the imaging portions and directions thereof relative to the calibration pattern in dependence upon the positions of the calibration pattern features in the images, the image position and direction calculating means being operable to:
process image data defining the images in the first set to calculate the imaging positions and directions thereof relative to the calibration pattern; and
if the second set of images comprises two or more images, process image data defining the images in the second set to calculate the imaging positions and directions thereof relative to the calibration pattern;
means for processing image data defining at least some of the images in the first set and the calculated imaging positions and directions thereof to generate data defining a preliminary three-dimensional computer model of the subject object having a position and orientation relative to the images in the first set;
means for calculating the relationship between the imaging positions and orientations of the images in the first set and the imaging positions and orientations of the images in the second set by changing the relative position and orientation of the preliminary three-dimensional computer model and the images in the second set to a position and orientation which substantially aligns the preliminary three-dimensional computer model with the image of the subject object in at least one image in the second set; and
means for generating data defining a refined three-dimensional computer model of the subject object by processing data defining images from the first and second sets and the calculated relative imaging positions and orientations thereof.

30. A method of processing image data defining images of a subject object to generate data defining a three-dimensional computer model of the subject object, comprising:
storing data defining a first set of images of the subject object recorded from different imaging positions and directions and data defining the relative imaging positions and directions;
storing data defining a second set of images comprising at least one further image of the subject object;
generating a preliminary three-dimensional computer model of the subject object using at least some of the images from the first set;
projecting the preliminary three-dimensional computer model into at least one image in the second set; and
using the projection result to generate a refined three-dimensional computer model of the subject object in dependence upon at least one image in the second set.

31. A method according to claim 30, wherein the process of using the projection result to generate a refined three-dimensional computer model of the subject object includes adjusting the relative position and orientation of the preliminary three-dimensional computer model and the at least one image in the second set to change the projection of the three-dimensional computer model in the at least one image in the second set.

32. A method according to claim 31, wherein the relative position and orientation of the preliminary three-dimensional computer model and the at least one image in the second set is adjusted in accordance signals input by a user.

33. A method according to claim 32, wherein image data is generated for display to the user showing the projection of the preliminary three-dimensional computer model relative to the image subject object in the at least one image in the second set to assist the user in changing the relative position and orientation.

34. Apparatus operable to process image data defining images of a subject object to generate data defining a three-dimensional computer model of the subject object, comprising:
- a data receiver operable to receive data defining a first set of images of the subject object recorded from different imaging positions and directions, data defining the relative imaging positions and directions and data defining a second set of images comprising at least one further image of the subject object;
- a preliminary three-dimensional computer model generator operable to generate a preliminary three-dimensional computer model of the subject object using at least some of the images from the first set;
- a three-dimensional computer model projector operable to project the preliminary three-dimensional computer model into at least one image in the second set; and
- a refined three-dimensional computer model generator operable to use the projection result to generate a refined three-dimensional computer model of the subject object in dependence upon at least one image in the second set.

35. Apparatus according to claim 34, wherein the refined three-dimensional computer model generator is operable to adjust the relative position and orientation of the preliminary three-dimensional computer model and the at least one image in the second set to change the projection of the three-dimensional computer model in the at least one image in the second set.

36. Apparatus according to claim 35, wherein the refined three-dimensional computer model generator is operable to adjust the relative position and orientation of the preliminary three-dimensional computer model and the at least one image in the second set in accordance signals input by a user.

37. A method according to claim 36, further comprising an image data generator operable to generate image data for display to the user showing the projection of the preliminary three-dimensional computer model relative to the image subject object in the at least one image in the second set to assist the user in changing the relative position and orientation.

38. Apparatus for processing image data defining images of a subject object to generate data defining a three-dimensional computer model of the subject object, comprising:
- means for receiving data defining a first set of images of the subject object recorded from different imaging positions and directions, data defining the relative imaging positions and directions and data defining a second set of images comprising at least one further image of the subject object;
- means for generating a preliminary three-dimensional computer model of the subject object using at least some of the images from the first set;
- means for projecting the preliminary three-dimensional computer model into at least one image in the second set; and
- means for using the projection result to generate a refined three-dimensional computer model of the subject object in dependence upon at least one image in the second set.

39. A storage medium storing instructions for causing a programmable processing apparatus to become operable to perform a method as set out in claim 1, claim 13 or claim 30.

40. A signal carrying instructions for causing a programmable processing apparatus to become operable to perform a method as set out in claim 1, claim 13 or claim 30.

41. A storage medium storing instructions for causing a programmable processing apparatus to become configured as an apparatus as set out in any one of claims 16, 27, 28, 29, 34 and 38.

42. A signal carrying instructions for causing a programmable processing apparatus to become configured as an apparatus as set out in any one of claims 16, 27, 28, 29, 34 and 38.

* * * * *

UNITED STATES PATENT AND TRADEMARK OFFICE
CERTIFICATE OF CORRECTION

PATENT NO. : 6,954,212 B2
APPLICATION NO. : 10/287624
DATED : October 11, 2005
INVENTOR(S) : Alexander Ralph Lyons et al.

It is certified that error appears in the above-identified patent and that said Letters Patent is hereby corrected as shown below:

Title page item (56), Page 2, Col. 2 line 12, REFERENCES CITED:

OTHER PUBLICATIONS, "Steven J. Gortier et al.," should read
--Steven J. Gortler et al.,--.

COLUMN 7:

Line 61, "for which a 3D computer model" should be deleted (second occurrence).

COLUMN 11:

Line 35, "model. 390" should read --model 390--.

COLUMN 18:

Line 43, "orentations" should read --orientations--.

COLUMN 25:

Line 7, "accordance" should read --accordance with--.

Signed and Sealed this

Twenty-ninth Day of August, 2006

JON W. DUDAS
*Director of the United States Patent and Trademark Office*